United States Patent
May

(10) Patent No.: US 8,224,884 B2
(45) Date of Patent: Jul. 17, 2012

(54) PROCESSOR COMMUNICATION TOKENS

(75) Inventor: Michael David May, Bristol (GB)

(73) Assignee: XMOS Ltd., London (GB)

( * ) Notice: Subject to any disclaimer, the term of this patent is extended or adjusted under 35 U.S.C. 154(b) by 747 days.

(21) Appl. No.: 12/027,435

(22) Filed: Feb. 7, 2008

(65) Prior Publication Data

US 2009/0013156 A1    Jan. 8, 2009

Related U.S. Application Data

(63) Continuation-in-part of application No. 11/822,471, filed on Jul. 6, 2007.

(51) Int. Cl.
*G06F 15/16* (2006.01)
(52) U.S. Cl. ......... 709/201; 709/202; 370/389; 370/392
(58) Field of Classification Search .......... 709/201–203, 709/206; 370/389, 392
See application file for complete search history.

(56) References Cited

U.S. PATENT DOCUMENTS

| | | | |
|---|---|---|---|
| 5,805,087 A * | 9/1998 | Walker | 341/95 |
| 5,805,589 A * | 9/1998 | Hochschild et al. | 370/389 |
| 7,447,186 B2 * | 11/2008 | Patel et al. | 370/389 |
| 7,546,234 B1 * | 6/2009 | Deb et al. | 709/201 |
| 2003/0227969 A1 * | 12/2003 | Wise et al. | 375/240.1 |
| 2004/0073779 A1 | 4/2004 | Hokenek et al. | |
| 2007/0033303 A1 | 2/2007 | Bridges et al. | |
| 2009/0013397 A1 * | 1/2009 | May | 726/9 |

FOREIGN PATENT DOCUMENTS

EP    0695993 A2    2/1996

OTHER PUBLICATIONS

International Searching Authority and International Search report dated Oct. 14, 2008.
Compaq Intel Microsoft NEC, Universal Serial Bus Specification 1.1 Chapter 8, Sep. 23, 1998, XP002497629, pp. 1-30.
Infiniband Trade Association, Infiniband Architecture Specification vol. 1, Jun. 19, 2001, XP002497630, pp. 1-54.

* cited by examiner

*Primary Examiner* — Bharat N Barot
(74) *Attorney, Agent, or Firm* — Sughrue Mion, PLLC

(57) ABSTRACT

The invention provides a method of transmitting messages over an interconnect between processors, each message comprising a header token specifying a destination processor and at least one of a data token and a control token. The method comprises: executing a first instruction on a first one of the processors to generate a data token comprising a byte of data and at least one additional bit to identify that token as a data token, and outputting the data token from the first processor onto the interconnect as part of one of the messages. The method also comprises executing a second instruction on said first processor to generate a control token comprising a byte of control information and at least one additional bit to identify that token as a control token, and outputting the control token from the first processor onto the interconnect as part of one of the messages.

62 Claims, 10 Drawing Sheets

PROCESSOR COMMUNICATION TOKENS

CROSS-REFERENCE TO RELATED APPLICATIONS

This is a Continuation-in-Part of application Ser. No. 11/822,471 filed Jul. 6, 2007, the entire disclosure(s) of the prior application(s), application number(s) Ser. No. 11/822,471 is considered part of the disclosure of the accompanying continuation-in-part application and is hereby incorporated by reference.

FILED OF THE INVENTION

The present invention relates to control tokens for controlling communications between processors and data tokens for carrying data between processors.

BACKGROUND OF THE INVENTION

One of the challenges facing processor designers is the handling of a number of communications between processors, particularly over interconnect systems having circuitry comprising switches and links for directing messages around arrays or large arrangements of processors, for example arranged on the same circuit board or chip.

A particular difficulty is in communicating control information. Messages sent over such an interconnect are typically made up of discrete bytes of data. However, there must also be a mechanism for transmitting control information for controlling the interconnect itself. The control information could be for example an "end-of-message" signal to close a channel established by the switches or a request to read or write to a control register of one of the switches or links. Finding a control mechanism which conveniently co-inhabits with the data transmission mechanism can be problematic.

Taking the "end-of-message" example as an illustration of this problem, a circuit designer might typically assign the byte-value 255 within a message as a control value to signal the end of a message and thus cause the switches to close the channel between two communicating processors. However, if a software developer wanted to communicate the actual number 255 to the destination software, without this being misinterpreted as a request to close the channel, then a complicated escape sequence would conventionally have to be built into the transfer mechanism in order to prevent the interconnect from being triggered in this way when desired.

Furthermore, there is a need to provide a more flexible control mechanism which is useful over a range of different application specific needs.

SUMMARY

According to one aspect of the present invention, there is provided a method of transmitting messages over an interconnect between processors, each message comprising a header token specifying a destination processor and at least one of a data token and a control token, the method comprising: executing a first instruction on a first one of said processors to generate a data token comprising a byte of data and at least one additional bit to identify that token as a data token; outputting the data token from said first processor onto said interconnect as part of one of said messages; executing a second instruction on said first processor to generate a control token comprising a byte of control information and at least one additional bit to identify that token as a control token; and outputting the control token from said first processor onto said interconnect as part of one of said messages.

By using tokens which are not bytes, but longer, complicated escape sequences can be avoided and a whole range of different control tokens are made available without impinging on the mechanism for transferring data. Further, by creating these control tokens using software rather than the control mechanism remaining invisible and inaccessible within the interconnect hardware itself, then the software developer has greater control over the interconnect control mechanism.

In embodiments, said control token is an architecturally-defined control token configured to trigger logic in said interconnect to control a component of said interconnect. Said architecturally-defined control token may be accessible by software executed on the respective destination processor. Said architecturally-defined control token may be a privileged control token accessible only by privileged software executed on the destination processor.

By allowing software access to architecturally defined control tokens, the software developer is provided with even greater flexibility in creating application specific control mechanism.

Said control token may be a software-defined control token configured to control a function in software executed on the respective destination processor.

The interconnect may comprise a system of switches and links connecting between said processors, said processors being on the same board or chip.

At least a portion of one of said data token and said control token may be the operand of the respective one of said first instruction and said second instruction. Said operand may be read from an operand register specified by the respective one of the first instruction and the second instruction. Said operand may be an immediate operand read directly from the respective one of the first instruction and the second instruction. At least a portion of one of said data token and said control token may be retrieved from a memory address specified by the respective one of the first instruction and said second instruction.

At least one of said links may comprise a one-line and a zero-line, wherein a logical transition on the one-line indicates a logic-one and a logical transition on the zero-line indicates a logic zero, each of said data and control tokens being transmitted on said link; and the steps of transmitting said data and control tokens may each comprise: transmitting a first portion of the token comprising said byte of data in case of a data token and said byte of control information in case of a control token, and further comprising a first additional bit to identify whether the token is a data token or a control token; and transmitting a second portion of the token to ensure the total number of logic-one bits in the token is even and the total number of logic-zero bits in the token is even, such that the link returns to a quiescent state at the end of the token.

The method may comprise determining whether the first portion contains an even number of bits at logic-one and an odd number of bits at logic-zero, or whether the first portion contains an odd number of bits at logic-one and an even number of bits at logic-zero; wherein on the condition that the first portion contains an even number of logic-ones and odd number of logic-zeros, the second portion is a logic-zero bit; and on the condition that the first portion contains an odd number of logic-ones and even number of logic zeros, the second portion is a logic-one bit.

The method may comprise establishing a streamed channel between the first processor and the destination processor. The method may comprise outputting a pause token from the first processor to temporarily close the streamed channel, the pause being ignored by input instructions executed on the destination processor; and reopening the streamed channel upon transferal of further information over that channel.

The method may comprise establishing a packetised channel between the first processor and the destination processor, and transferring said messages over the packetised channel in the form of packets each including a header and an end-of-message token configured to close the packetised channel in said interconnect.

The method may comprise receiving a first one of said packets at the destination processor from the first processor; executing, on the destination processor, an input instruction which traps if it detects receipt of an end-of-message token in said first packet; and subsequently executing, on the destination processor, a check-end-of-message instruction which traps unless it detects receipt of an end-of-message token in one of said packet from the first processor.

The packetised channel may be a synchronised channel, whereby the method may comprise: transmitting a return packet comprising a further end-of message token to the first processor from the destination processor; executing, on the first processor, a further check-end-of-message instruction which traps unless it detects receipt of the further end-of-message token from the second processor.

Said control token may be one of: an end-of-message token, a read token to read from the destination processor's memory, a write token to write to write to the destination processor's memory, an acknowledgement token to acknowledge successful completion of an operation, an error token to indicate an unsuccessful attempt at an operation, a read ID token to read an identifier from a control register of one of said switches, a write ID token to write an identifier to a control register of one of said switches, a read type token to read a device type from one of said switches, a read configuration token to read configuration information from a control register of one of said switches, a write configuration token to write configuration information to a control register of one of said switches, a start token to enable one of said switches, a stop token to disable one of said switches, and a query token to query the status of one of said links.

The interconnect may be between more than two processors of an array.

The method may comprise discarding a header token of a message before reaching the destination processor.

At least one of said links may comprise at least three lines arranged to transmit said data and control tokens using an encoding scheme whereby logical transitions on said lines are used to signal respective codes; and the transmission of each of the data and control tokens may comprise transmitting a sequence of codes selected from said codes, said additional bit for each of the data and control tokens being encoded in at least one of the transmitted codes.

The link may comprise five lines, logical transitions on four of said lines encoding respective values and a logical transition on the remaining fifth of said lines being an escape code; the transmission of the data token may comprise transmitting a sequence of codes signalled on said four lines, said additional bit for the data token being encoded by none of the codes being in the data token being an escape code signalled using said fifth line; and the transmission of the control token may comprise transmitting a sequence of codes selected from said codes including the escape code, said additional bit for the data token being encoded by the signalling of the escape code using said fifth line.

The method may comprise transmitting at least one of said codes to ensure the total number of logical transitions on each of said lines following one or more tokens returns the link to a quiescent state.

The method may comprise transmitting a credit token generated by the link to indicate a free capacity of the link, the credit token comprising one or more pairs of said codes, the codes in each pair being the same, so that the total number of transitions on each of said lines is either even nor zero thus leaving the state of the link unaffected after transmission of the credit token.

At the receive side, another aspect of the invention provides a method of receiving messages over an interconnect between processors, the method comprising: receiving at a destination processor, via said interconnect, a token comprising a byte and at least one additional bit; executing software on said destination processor to determine from said additional bit whether the token is a control token or a data token; and on the condition that the token is a control token, accessing said control token using software executed on the destination processor in order to perform a function in software.

According to another aspect of the invention, there is provided a device comprising a first processor for transmitting messages over an interconnect between processors, each message comprising a header token specifying a destination processor and at least one of a data token and a control token, the first processor being configured to: execute a first instruction to generate a data token comprising a byte of data and at least one additional bit to identify that token as a data token; output the data token from said first processor onto said interconnect as part of one of said messages; execute a second instruction to generate a control token comprising a byte of control information and at least one additional bit to identify that token as a control token; and output the control token from said first processor onto said interconnect as part of one of said messages.

According to another aspect of the present invention, there is provided a device for receiving messages from a first processor, the device comprising a destination processor and a interconnect between processors, the destination processor being configured to: receive, via said interconnect, a token comprising a byte and at least one additional bit; execute software to determine from said additional bit whether the token is a control token or a data token; and on the condition that the token is a control token, access said control token using software executed on the destination processor in order to perform a function in software.

According to another aspect of the invention, there is provided a computer program product for transmitting messages over an interconnect between processors, each message comprising a header token specifying a destination processor and at least one of a data token and a control token, the program comprising code which when executed by a processor performs the steps of: executing a first instruction on a first one of said processors to generate a data token comprising a byte of data and at least one additional bit to identify that token as a data token; outputting the data token from said first processor onto said interconnect as part of one of said messages; executing a second instruction on said first processor to generate a control token comprising a byte of control information and at least one additional bit to identify that token as a control token; and
outputting the control token from said first processor onto said interconnect as part of one of said messages.

According to another aspect of the invention, there is provided a computer program product for receiving messages over an interconnect between processors, the program comprising code which when executed by a processor performs the steps of: receiving at a destination processor, via said interconnect, a token comprising a byte and at least one additional bit; executing software on said destination processor to determine from said additional bit whether the token is a control token or a data token; and on the condition that the token is a control token, accessing said control token using software executed on the destination processor in order to perform a function in software.

According to another aspect of the invention, there is provided a device comprising a first processing means for transmitting messages over interconnection means between processing means, each message comprising a header token specifying a destination processing means and at least one of a data token and a control token, the first processing means comprising: execution means for executing a first instruction to generate a data token comprising a byte of data and at least one additional bit to identify that token as a data token; outputting means for outputting the data token from said first processing means onto said interconnection means as part of one of said messages; wherein the execution means is further for executing a second instruction to generate a control token comprising a byte of control information and at least one additional bit to identify that token as a control token; and the outputting means is further for outputting the control token from said first processing means onto said interconnection means as part of one of said messages.

According to another aspect of the invention, there is provided a device for receiving messages from a first processing means, the device comprising a destination processing means and a interconnection means between processing means, the destination processing means comprising: receiving means for receiving, via said interconnection means, a token comprising a byte and at least one additional bit; and execution means for executing software to determine from said additional bit whether the token is a control token or a data token; wherein in the execution means is further for, on the condition that the token is a control token, accessing said control token using software executed on the destination processing means in order to perform a function in software.

DETAILED DESCRIPTION OF THE DRAWINGS

DETAILED DESCRIPTION OF THE PREFERRED EMBODIMENTS

Figure 1:
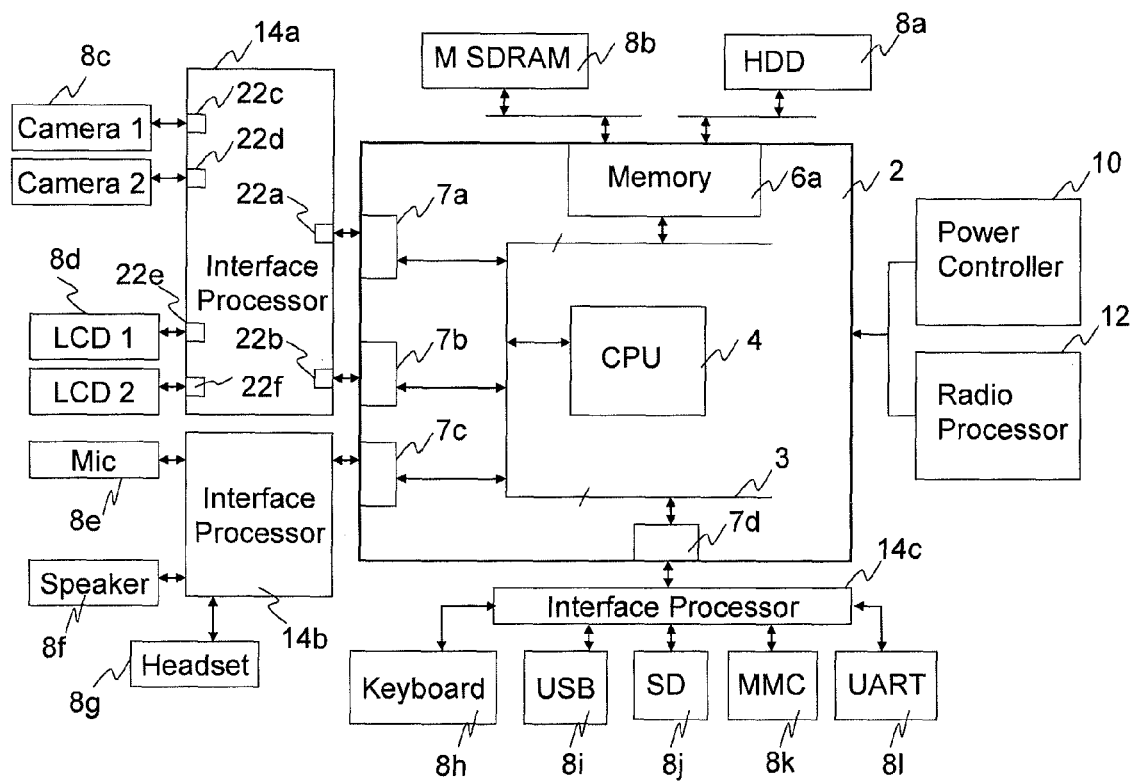
FIG. 1 illustrates an example application of an interface processor.

FIG. 1 shows an exemplary application of interface processors in a mobile telephone. The mobile applications processor 2 needs to communicate with the plurality of peripheral devices 8. The applications processor 2 comprises a bus 3, a CPU 4, and a memory controller 6a for interfacing with a hard-drive (HDD) 8a and a SDRAM memory 8b, as well as a power controller 10 and radio processor 12.

The arrangement of FIG. 1 allows the CPU 4 to communicate externally via generic ports 7. In this example, generic ports 7a and 7b are provided for interfacing with cameras 8c and LCD displays 8d; a generic port 7c is provided for interfacing with a microphone 8e, speaker 8f and headset 8g; and a generic port 7d is provided for interfacing with a keyboard 8h, a Universal Serial Bus (USB) device 8i, a Secure Digital (SD) card 8j, an Multi-Media Card (MMC) 8k, and a Universal Asynchronous Receiver/Transmitter (UART) device 8l.

In FIG. 1, interface processors 14a, 14b and 14c are placed at the outputs of the relevant ports 7, with a first interface processor 14a being connected between the image devices 8c-8d and the generic ports 7a-7b, a second interface processor 14b being connected between the audio devices 8e-8g, and a third interface processor 14b being connected between the generic port 7d and the various connectivity devices 8h-8m. The ports 7 need only be general purpose ports because the application-specific display, audio and connectivity functions are implemented by the interface processors 14a-14c in a manner to be described later. The ports 7 need not to use FPGA logic, because the interface processors 14 provide the flexibility and configurability that would otherwise be provided by FPGAs. The interface processor 14a has ports 22a and 22b connected to the ports 7a and 7b, and ports 22c, 22d, 22e and 22f connected to the external devices 8c and 8g. The interface processors 14b and 14c have similar ports, not shown in FIG. 1.

The interface processors are typically involved in implementing the specific protocols used to transfer data via the interfaces, re-formatting data including converting it between parallel and serial formats, and possibly higher level functions such as encoding it, compressing it or encrypting it.

Figure 2:
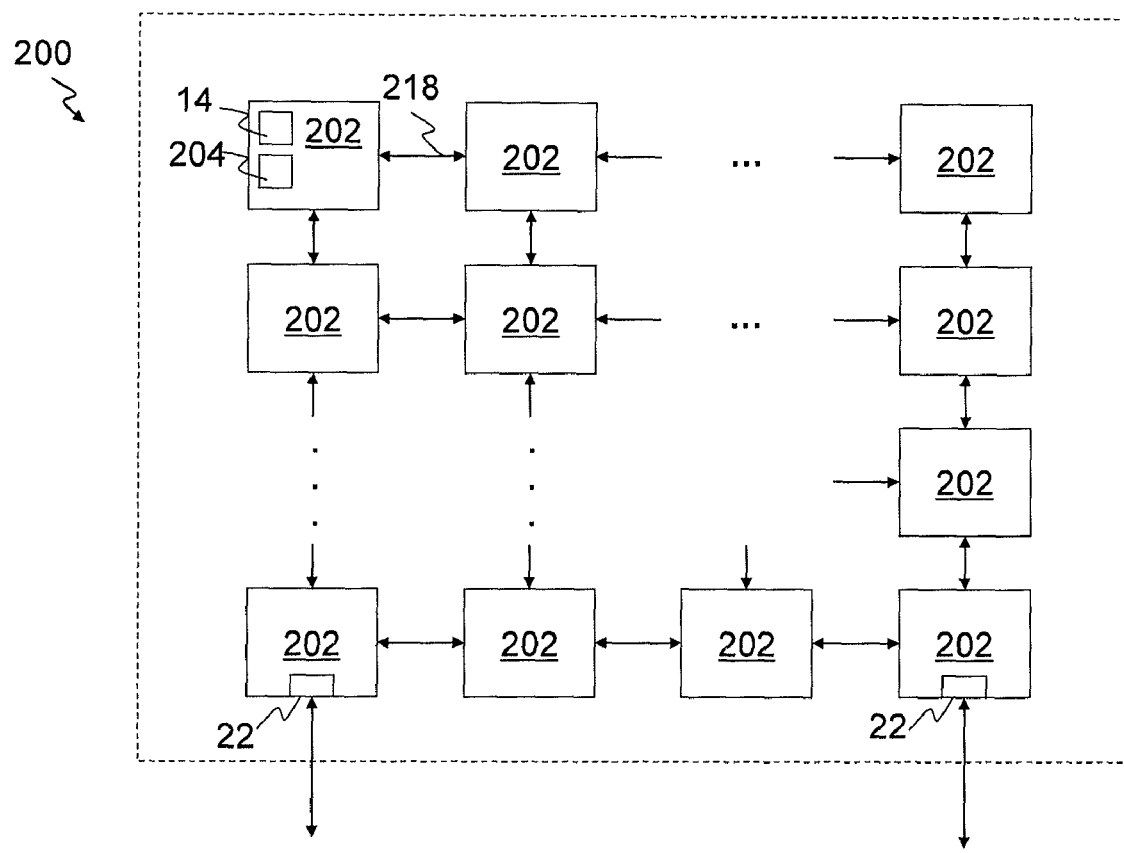
FIG. 2 illustrates another example application of an interface processor.

Another application of an interface processor 14 is as part of a multiprocessor array 200 illustrated in FIG. 2. Such an array 200 comprises a plurality of processor tiles 202, with each tile defining a node in the array and comprising one or more processors 14 and an interconnect 204. The tiles 202 are connected via high performance connections 218 which support communication between the tiles 202 in the array 200, with some of the processors 14 using ports 22 for communication with other devices external to the array 200. The array could be implemented on a single chip or assembled from a number of chips.

An important feature of the interface processor which is discussed more fully in the following is its ability to manage communications, both internal and external. Each interface processor comprises a CPU, memory and communications. To allow the direct and responsive connectivity between the CPU and the ports, each processor has hardware support for executing a number of concurrent program threads, each comprising a sequence of instructions, and at least some of which may be responsible for handling communications. As will be discussed more fully in the following, the hardware support includes:

a set of registers for each thread,
    a thread scheduler which dynamically selects which thread to execute,
    a set of ports used for input and output (ports 22), and
    an interconnect system for establishing channels between threads.

The provision of a small set of threads on each processor can be used to allow communications or input/output to progress together with other pending tasks handled by the processor, and to allow latency hiding in the interconnect by allowing some threads to continue whilst others are suspended pending communication to or from remote interface processors.

Figure 3:
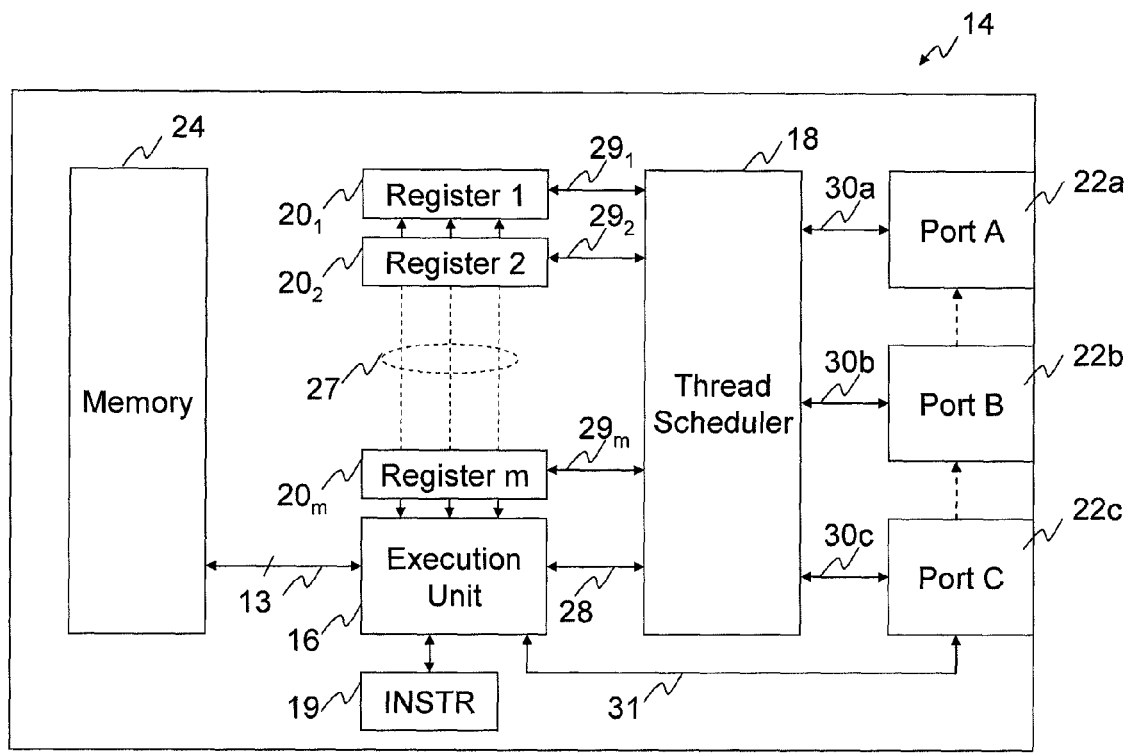
FIG. 3 is a schematic representation of the architecture of an interface processor.

FIG. 3 shows schematically an exemplary architecture of an interface processor 14 according to one embodiment of the present invention. The processor 14 comprises an execution unit 16 for executing threads of instructions under the control of a thread scheduler 18. The processor 14 further comprises a Random Access Memory (RAM) 24 for holding program code and other data, and a Read Only Memory (ROM) (not shown) for storing permanent information such as boot code.

The thread scheduler 18 dynamically selects which thread the execution unit 16 should execute. Conventionally, the function of a thread scheduler would simply be to schedule threads from the program memory in order to keep the processor fully occupied. However, according to the present invention, the scheduling by the thread scheduler 18 is also related to activity at the ports 22. It is noted in this respect that the thread scheduler may be directly coupled to the ports 22 so as to minimise the delay when a thread becomes runnable as a result of an input or output activity at the port.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16. Data can be communicated between register sets 20 via channels. The details of these registers and channels are discussed later.

Of the m threads, the thread scheduler 18 maintains a set of n runnable threads, the set being termed "run", from which it takes instructions in turn, preferably in a round-robin manner. When a thread is unable to continue it is suspended by removing it from the run set. The reason for this may be, for example, because the thread is awaiting one or more of the following types of activity:

its registers are being initialised prior to it being able to run,
  it has attempted an input from a port or channel which is not ready or has no data available,
  it has attempted an output to port or channel which is not ready or has no room for the data,
  it has executed an instruction causing it to wait for one or more events which may be generated when ports or channels become ready for input.

Note that the term "event" as used herein refers to a particular type of operation, which is slightly different from basic input-output operation. The distinction is discussed below in relation to FIGS. 4 and 5.

Advantageously, in order to facilitate rapid reaction time, a direct hardwired connection 28 is provided between the thread scheduler 18 and the execution unit 16 to allow the thread scheduler 18 to control which thread or threads the execution unit 16 should fetch and execute. Direct hardwired paths 30a, 30b, 30c are also provided between the thread scheduler 18 and each of the ports 22; and direct hardwired paths $29_1 \ldots 29_m$ are provided between the thread scheduler 18 and each of the registers 20. These direct paths preferably provide control paths which allow the thread scheduler to associate a respective thread with one or more of the ports 22, and particularly to return ready indications from the ports when certain activity occurs, allowing the processor to respond quickly to activity or stimuli occurring at the ports 22. The operation of the thread scheduler in relation to the ports is discussed below with regard to FIGS. 4 and 6.

The execution unit 16 also has access to each of the ports 22a-22c and each of the registers $20_1$-$20_m$ via direct connections 27 and 31, thus providing a direct link between the core processor, registers, and the external environment. Preferably, these direct paths provide further control paths allowing the execution unit to pass conditions to the ports. This is discussed in further detail below with regard to FIG. 4. The direct paths 27 and 31 may also allow data to be input and output directly between the thread registers 20 and the ports 22, thus allowing threads to communicate directly with the external environment. For example, data may be written directly from an external device to one of a thread's operand registers, rather than being written to memory 24 and then subsequently fetched. Conversely, following an operation, data from an operand register may be picked up by the execution unit 16 and sent directly out of a port 22. This improves reaction time significantly.

Note that by "direct connection" or "direct path" it is meant a connection separate from the connection between the execution unit and the program memory 24. Thus, for example, the thread scheduler 18 and execution unit 16 have access to data input from ports 22 without that data being stored and then subsequently fetched from memory 24. Particularly, if the connection between the execution unit 16 and memory 24 is via a bus 13, then a "direct" connection or path means one which is separate from the bus. Thus the various communications between ports 22, registers 20, thread scheduler 18 and execution unit 16 can all occur without the need for bus arbitration, improving reaction time. The ports 22 may also be provided with an additional connection (not shown) with the bus 13.

Figure 4:
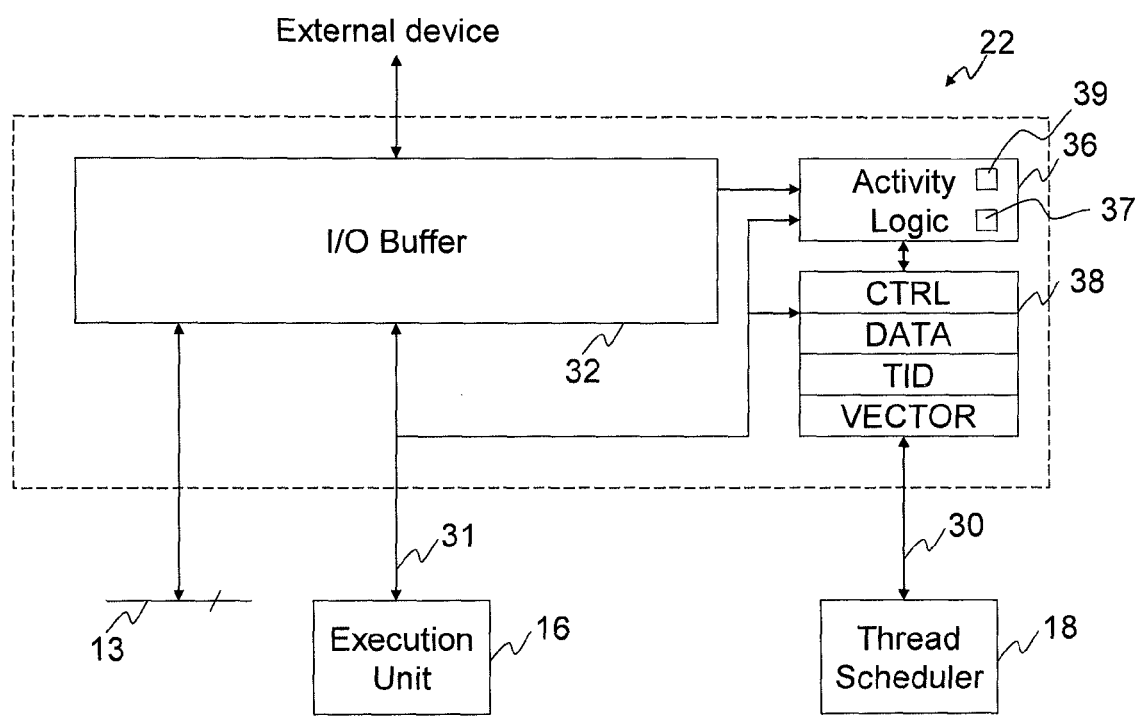
FIG. 4 is a schematic representation of a port.

FIG. 4 shows schematically a port 22 according to a preferred embodiment of the invention. The port 22 comprises an I/O buffer 32 for passing input and output data to and from the processor 14. In addition, each port 22 comprises activity handling logic 36 for monitoring activity occurring at the port and signalling the occurrence of certain activity by means of at least one ready bit or flag 37. The ready flag 37 is preferably signalled to the thread scheduler via direct path 30. Potential activity which the port may detect includes:

data has been input to the port,
  some specific data has been input to the port, and/or
  the port has become available for output.

To facilitate the detection of such activity, the port 22 is provided with a set of registers 38. These comprise a thread identifier (TID) register for storing an identification of the relevant thread, a control (CTRL) register for storing one or more conditions, a continuation point vector (VECTOR) register for storing the position in the program where execution was suspended, and a data (DATA) register for storing any data associated with a condition. The value TID is written to the registers 38 by the thread scheduler 18 via the direct path 30 (which would be 30a, 30b, 30c in FIG. 3), and the values VECTOR, CTRL and DATA are written by the execution unit 16 via the direct path 31. The TID is returned to the thread scheduler 18 upon detection of the desired activity in order to identify the associated thread. The activity logic also comprises an enable flag 39, which is discussed in further detail below.

Note that although the registers 38 are shown in FIG. 4 as being contained within the port 22, they may in fact be situated elsewhere within the processor 14 and simply associated with the port 22.

Figure 5:
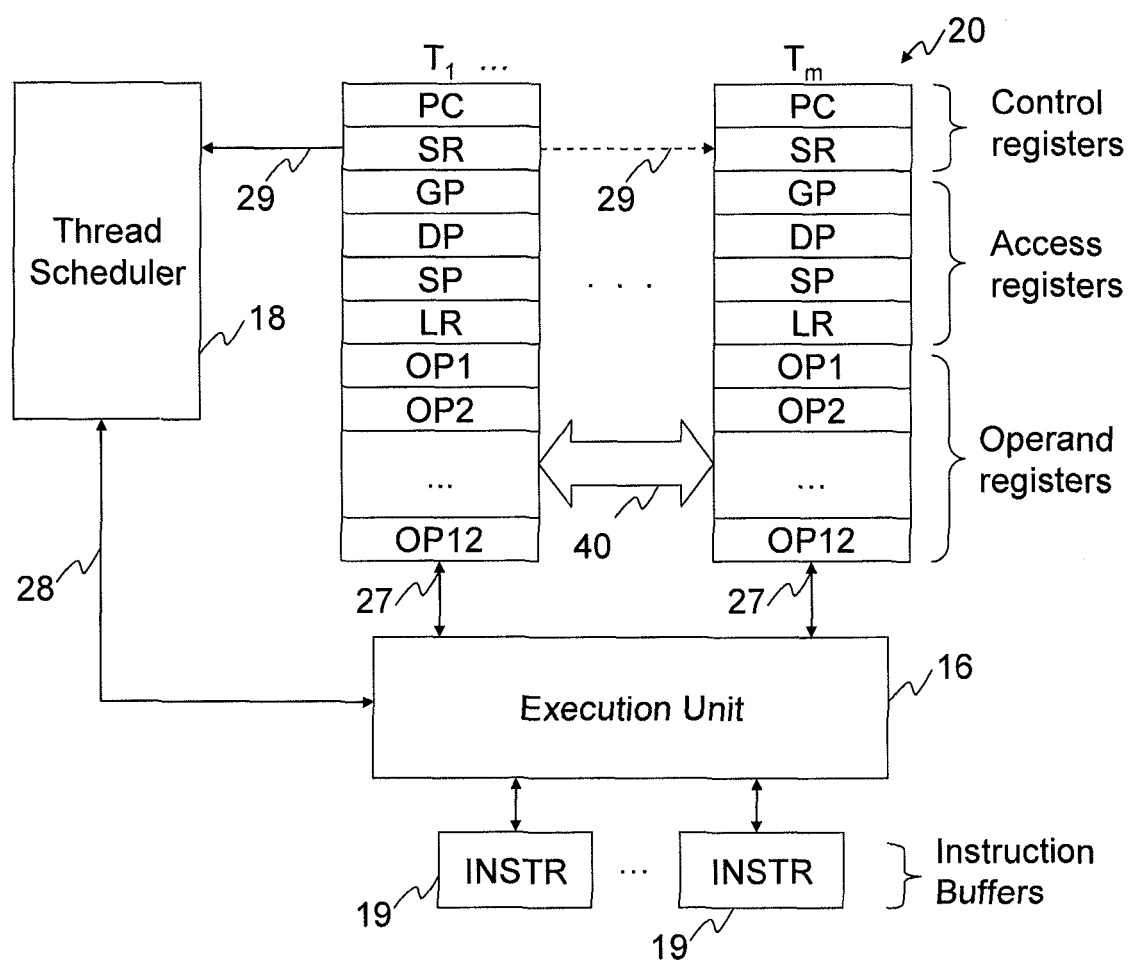
FIG. 5 is a schematic representation of thread register sets.

FIG. 5 shows an exemplary bank of thread registers 20 used to represent the threads. The bank 20 comprises a plurality of sets of registers corresponding to respective threads $T_1$ to $T_m$ which are currently under consideration by the thread scheduler 18. In this preferred example, the state of each thread is represented by eighteen registers: two control registers, four access registers, and twelve operand registers. These are as follows.

Control Registers:
PC is the program counter
SR is the status register

Access Registers:
GP is the global pool pointer
DP is the data pointer
SP is the stack pointer
LR is the link register Operand Registers: OP1 . . . OP12

The control registers store information on the status of the thread and are for use in controlling execution of the thread. Particularly, the ability of a thread to react to events or interrupts is controlled by information held in the thread status register SR. The access registers include a stack pointer used for local variables of procedures, a data pointer normally used for data shared between procedures and a constant pool pointer used to access large constants and procedure entry points. The operand registers OP1 . . . OP12 are used by instructions which perform arithmetic and logical operations, access data structures, and call subroutines. As discussed in relation to FIGS. 6 and 7, the processor also comprises an interconnect system 40 for establishing channels between the operand registers OP of different sets 20.

A number of instruction buffers (INSTR) 19 are also provided for temporarily storing the actual instructions of the thread. Each instruction buffer is preferably sixty-four bits long, with each instruction preferably being sixteen bits long, allowing for four instructions per buffer. Instructions are fetched from program memory 24 under control of the thread scheduler 18 and placed temporarily in the instruction buffers 19.

The execution unit has access to each of the registers 20 and buffers 19. Further, the thread scheduler 18 has access to at least the status register SR for each thread.

As mentioned above, the term "event" as used herein refers to a particular type of operation, or to the activity corresponding to that particular type of operation. Event based operations are slightly different from basic input-output operations, and work as follows. An event is first set for a thread by transferring a continuation point vector from the execution unit 16 and a thread identifier from the thread scheduler 18 to the VECTOR and TID registers 38 associated with a port 22, preferably via direct paths 31 and 30. An associated condition and condition data may also be written to the CTRL and DATA registers 38 of the port 22. The event is thus set at the port, but not necessarily enabled. To enable the port to generate an indication of an event, the port's enable flag 39 must also be asserted, preferably by the thread scheduler 18 via direct path 30. Further, to enable the thread itself to accept events, the thread's event enable (EE) flag in the respective status register SR for the thread must be set to event-enabled. Once the event is thus set and enabled, the thread can be suspending awaiting the event using an event-based wait instruction which acts on the thread scheduler 18. At this point, the current pending instruction may be discarded from the relevant instruction buffer 19. When the event occurs, e.g. some data is input to the port, the occurrence is signalled by the return of the thread identifier and continuation point vector from the port 22 to the thread scheduler 18 and execution unit 16 respectively, allowing the instruction identified by the continuation point vector to be fetched from program memory 24 into an instruction buffer 19 and execution resumed at the appropriate point in the code. For example, if the awaited event is the input of some particular data, then the continuation point vector may identify code including an input instruction for inputting the data.

When the event occurs, the thread's EE flag in the respective status register SR may be set to event-disabled to prevent the thread from reacting to events immediately after the occurs. The enable flag 39 may be de-asserted as a result of the thread executing instructions when the event occurs.

The enable flag 39 can be asserted whilst setting up a number of ports in preparation for waiting for an event from one or more of the ports. The thread's EE flag may also be set to event-enabled prior to enabling a set of port enable flags and in this case the first port to be enabled which is ready will generate and event causing the current instruction to be discarded and execution to proceed by immediately fetching and executing the instruction at the continuation point vector.

The advantage of the port's enabling flag 39 and status register EE flag is that the enabling and disabling of events is separated from both the setting up of the events and the suspension of a thread by a wait instruction, allowing different input and output conditions to be readily toggled on and off for a particular thread and/or for various different threads. For example, an event may be left set up at a port 22 even though the event is disabled. Thus events may be re-used by a thread because, although the event has already occurred once, the thread identifier, continuation point vector and condition are still stored in the TID, VECTOR, CTRL and DATA registers 38 of the port 22. So if the thread needs to re-use the event, the port's registers 38 do not need to be re-written, but instead the port's enable flag 39 can simply be re-asserted and/or the EE flag in the status register SR for a thread can be re-set to event-enabled. A further wait instruction will then suspend the thread pending a re-occurrence of the same event.

Furthermore, the use of continuation point vectors allows multiple events to be enabled per thread. That is, a given thread can set up one event at one port 22a by transferring a continuation point vector to that port, set up another event at another port 22b by transferring a different continuation point vector to that other port, and so forth. The thread can also enable and disable the various events individually by separately asserting or de-asserting the different enable flags 39 for each respective port. A wait instruction will then cause the thread to be suspended awaiting any enabled event.

Figure 6:
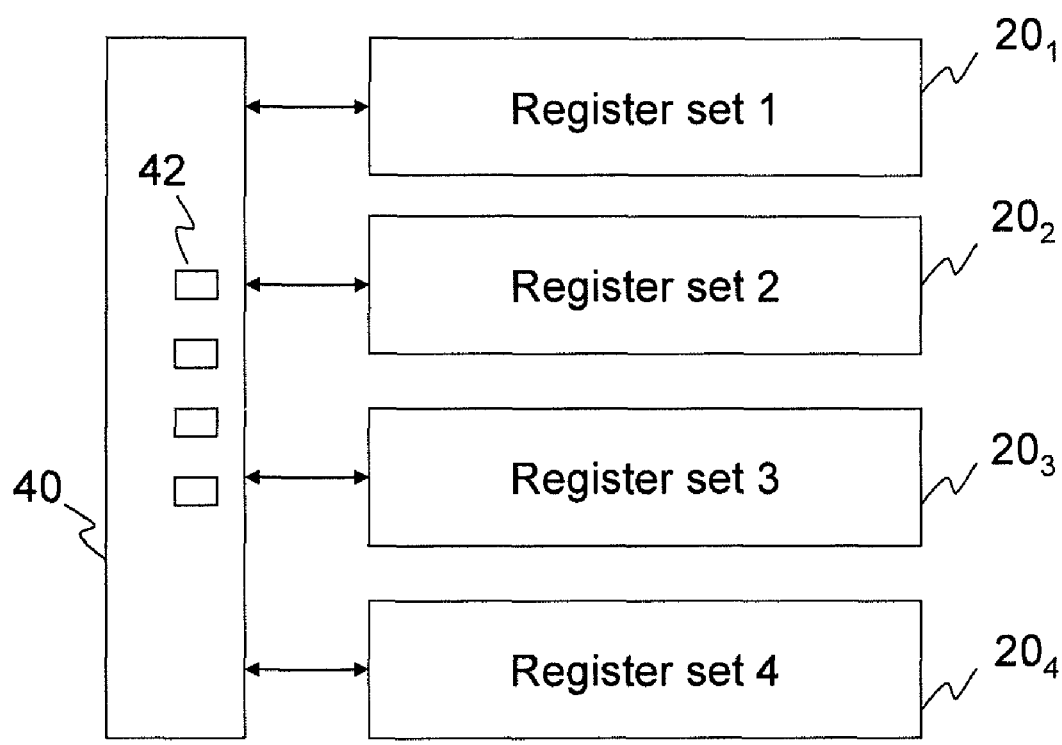
FIG. 6 is a schematic representation of an interconnect between thread register sets.

In contrast with events, basic I/O operations use only an input or output instruction without a prior wait instruction. Using basic I/O operations, the thread scheduler 18 does not transmit a continuation point vector to the VECTOR register, and does not use the port's enable flag 39 or the EE flag in the status register SR. Instead, the next pending instruction is simply left in an instruction buffer 19 and if necessary the input or output instruction acts on the thread scheduler 18 to cause execution to be paused pending either an input of data or the availability of the port for output, as indicated by the ready flag 37. If the port is ready straight away, i.e. the ready flag 37 is already set when the input or output instruction is executed, then the thread will not be paused. In embodiments, only the TID register may be required for scheduling according to a basic I/O. A basic I/O may or may not use a condition in the CTRL and DATA registers. If such a condition is not used, the I/O will simply be completed as soon as the port is ready. The basic I/O operation pauses and un-pauses the thread but does not effect the port's enable flag 39 or the EE flag in the status register, nor transfer control to the event vector Similar event and I/O techniques can also be applied to communication between threads, or more accurately between the thread register sets 20 which store information relating to the threads. FIG. 6 shows an interconnect system 40 comprising circuitry for establishing channels. For illustrative purposes, only four thread register sets $20_1$ to $20_4$ are shown in FIG. 6, each storing information for a respective thread $T_1$ to $T_4$. Each of the thread register sets is connected to each of the other sets by the interconnect system 40, which is a direct hardware interconnection operable to establish at least one channel for transferring data directly between at least two of the thread register sets 20. The interconnection is direct in the sense that it does not use a Direct Memory Access (DMA) and the transfer does not occur via any shared memory such as the RAM 24, nor via any general purpose system bus such as the bus 13. Channels are preferably used to transfer data to and from the operand registers OP, but could in principle be used to transfer information to or from other types of register such as a status register SR. The thread scheduler 18 can schedule threads based on activity occurring over channels in a similar manner as discussed in relation to ports above. The general term used herein to cover ports, channels, and other sources of activity is "resource".

The interconnect system 40 comprises a plurality of hardware terminals 42, referred to herein as "channel ends", for use in establishing channels between threads. Each channel end (i.e. channel terminal) can be allocated to any of the thread register sets 20, and each channel end 42 is connectable to any other channel end 42, by means of the interconnect system 40. For illustrative purposes only four channel ends are shown in FIG. 6, but it will be appreciated there may be different numbers and in general there may not be the same number of channel ends 42 as there are register sets 20.

Each channel end 42 comprises a buffer to hold incoming data before it is input, and preferably also a record of the amount of data held. The channel end 42 also keeps a record of whether it is connected to another channel end or not, and of the address of the connected channel end so that data output via the channel can be written to the correct input buffer. These buffers and records can be implemented using two files, the channel input file and the channel output file. These channel input and output "files" are part of a "register file", which in this sense refers to a small block of dedicated memory on the processor 14 for implementing the registers and buffers. The register file is distinct from general purpose RAM such as memory 24, because each entry in the register file (i.e. each register) is reserved for a specific purpose and furthermore because access to the registers is not via a system bus 13.

Figure 7:
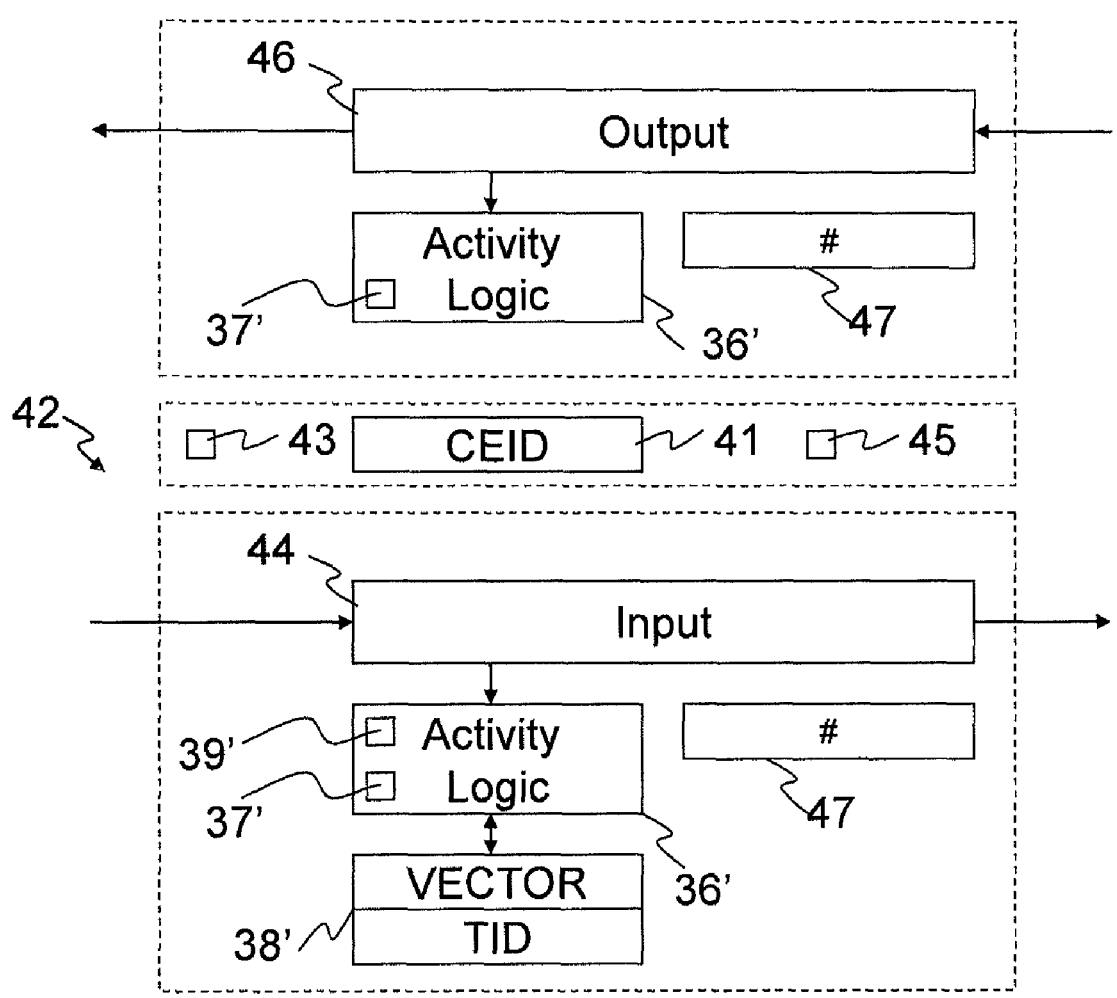
FIG. 7 is a schematic representation of a channel end.

As shown in FIG. 7, each of the channel ends 42 resembles a pair of ports, with an input buffer 44 and an output buffer 46 to provide full-duplex data transfer between threads (although a single buffer would also be an option). The input buffer 44 is operable to input data from another channel end 42 to the register set 20 of a thread, and the output buffer 46 is operable to output data from the register set 20 of the thread to the other channel end 42. Preferably each buffer is able to hold sufficient tokens to allow at least one word to be buffered.

As with the ports 22, each channel input buffer 44 and output buffer 46 may be associated with activity handling logic 36' for monitoring activity occurring over a channel and signalling the occurrence of certain activity by means of at least one ready flag 37' (a flag is a one-bit register). Potential activity may be: that data has been input to the channel, or that the channel has become available for output. If an output instruction is executed when the channel is too full to take the data then the thread scheduler 18 pauses that instruction and restarts or re-executes it again when there is enough room in the channel for the instruction to successfully complete. Likewise, when an input instruction is executed and there is not enough data available then the thread scheduler 18 pauses the thread until enough data does become available. Counters 47 in the channel end 42 keep a record of the amount of data in the input buffer 44 and output buffer 46.

In order to establish a channel between two sets of thread registers, two channel ends must be allocated and connected. As mentioned above, each channel end can be allocated to any thread and each channel end 42 is connectable to any other channel end 42. To facilitate the allocation and connection of channel ends 42, each end 42 also comprises a channel end identifier register CEID 41 which records which other channel end that end is connected to, a connected flag 43 which records whether the channel end is connected, and a claimed flag 45 which records whether the channel end has been claimed by a thread.

In order to allocate respective channel ends 42 to each of the two threads, two respective "get channel end" instructions are executed, each of which instructions reserves a channel end 42 for use by one of the threads. These instructions also each assert the claimed flag 43 of the respective channel end 42. A respective "get channel end" instruction may be executed in each of the two threads, or both "get channel end" instructions may be executed by one master thread.

The channel ends are then connected together by exchanging channel end identifiers as follows. When an output instruction of a first thread is executed in order to perform an output to the channel end of a second thread, the connected flag 43 in the second thread's channel end is used to determine whether the second thread's channel end is currently connected. If the second thread's channel end is not connected, the data supplied to that channel end is interpreted as an identifier of the first thread's channel end. This identifier is recorded in the CEID register 41 of the second thread's channel end and the connected flag 43 of the second thread's channel end is asserted. Reciprocally, an output instruction of the second thread is then executed to perform an output to the first channel end. Assuming the connected flag 43 of the first thread's channel end is not yet asserted, the data supplied to the first thread's channel end is interpreted as the identifier of the second thread's channel end. This identifier is recorded in the CEID register 41 of the first thread's channel end and the connected flag 43 of the first thread's channel end is asserted.

Once the channel ends 42 are connected, any output to the second channel end will determine the associated first channel end from the record in the second channel end's identifier register CEID 41. If there is enough room in the input buffer of the second channel end to hold the data, the data will be transferred; otherwise the first thread's output instruction is paused. The supply of data to the second channel end by the output instruction may also un-pause the second thread if it was paused pending input to the second channel end, allowing it to take data. Similarly, if the effect of the second thread inputting data from the second channel end is to make space for data from a paused output of the first thread from the first channel end, this will un-pause the first thread's output allowing it to complete execution. The input may also trigger events (see below). For each thread, the thread scheduler 18 keeps a record of any paused output instruction, its associated data, and the channel end to which it is attempting to transfer data.

Once the channel is no longer needed, channel ends 42 can be disconnected by executing an instruction which outputs an "end of message" (EOM) control token. The channel ends 42 will then be available for connection with any other channel ends. Also, each channel end 42 can be freed from a thread by executing a "free channel" instruction. The channel ends 42 will then be freed for use by any other threads.

Described in terms of the channel register files, when a processor executes an output on a channel end c, the $c^{th}$ entry in the channel output file is checked to determine whether c is connected. If not, the output data d is interpreted as the address (i.e. ID) of the channel end to which further output on c will be sent. The address d is examined to determine whether it is an address of a channel end on the same processor. If so, the address d is written to the $c^{th}$ entry in the channel output file. Subsequent outputs via c will access the $c^{th}$ entry to determine the channel end connected to c and, provided it is not full, write the output data to the input data of the connected channel end d. If the buffer is found to be full, the output instruction is paused until there is enough space in the buffer, and in this case the outputting thread will be released by an input instruction which creates enough space.

When an input is executed on a channel end c, the $c^{th}$ entry in the input buffer file is read to determine whether it contains data. If so, the data is taken and the input completes. Otherwise the inputting thread is paused and will be released by a subsequent output instruction which writes sufficient data to the input buffer of c.

The thread scheduler 18 maintains a "paused table" with one entry for each thread, which is used to record which channel end is paused for (if any). Whenever an input on channel end c completes, or an output on a channel associated with a channel end c completes, this table is checked and if there is a thread paused for c it is released.

When an EOM token is output via c, the $c^{th}$ entry in the output file is modified to record that the channel end is no longer connected.

To reduce the amount of logic required, preferably only one instruction initialises a channel at any one time, and only one communication instruction needs to perform an operation on a given channel end at any one time. However, the possibility of operating on multiple channels is not excluded.

The described system of channel ends is particularly efficient in terms of code density, because the number of instructions carried by each thread in order to control and perform inter-thread communications is reduced, with much of the functionality being instead implemented in the hardware channel ends and no DMA or access to memory 24 being required.

Again as with the ports 22, in order to facilitate the detection of activity occurring over the channel, the input buffer 44 of each channel end 42 is associated with registers 38'. These comprise a thread identifier (TID) register for storing an identification of the relevant thread, and a continuation point vector (VECTOR) register for storing the position in the program where execution should resume upon occurrence of an event. These TID and VECTOR registers can then be used by the thread scheduler 18 and execution unit 16 to schedule threads in dependence on events, in the same manner as with the ports 22. That is, by storing a thread identifier and continuation point vector for the thread in order to set up an event, suspending the thread using a wait instruction, and then returning to a point in the code specified by the continuation point vector once the event has occurred. The event in this case would be the input of data to the channel end 42. The VECTOR register also allows the channel to generate interrupts. The channel end also has an enable flag 39' to enable the channel to generate events. In preferred embodiments, the channel ends 42 may not be provided with CTRL and DATA registers, although that possibility is not excluded.

Note that to minimise communications delay, the input and output instructions for transferring data over channels may advantageously act directly on the thread scheduler 18. That is, when executed by the execution unit 16, the instruction causes the thread scheduler to pause the relevant thread by removing it from the run set, provided that the ready bit 37' for that channel does not currently indicate that the channel is ready. Similarly, event-based wait instructions will cause the thread scheduler to suspend execution of the thread provided that the event has not occurred, the thread's event enable flag EE is not set in the thread's status register SR, and/or the channel end's event enable flag is not asserted.

Figure 8:
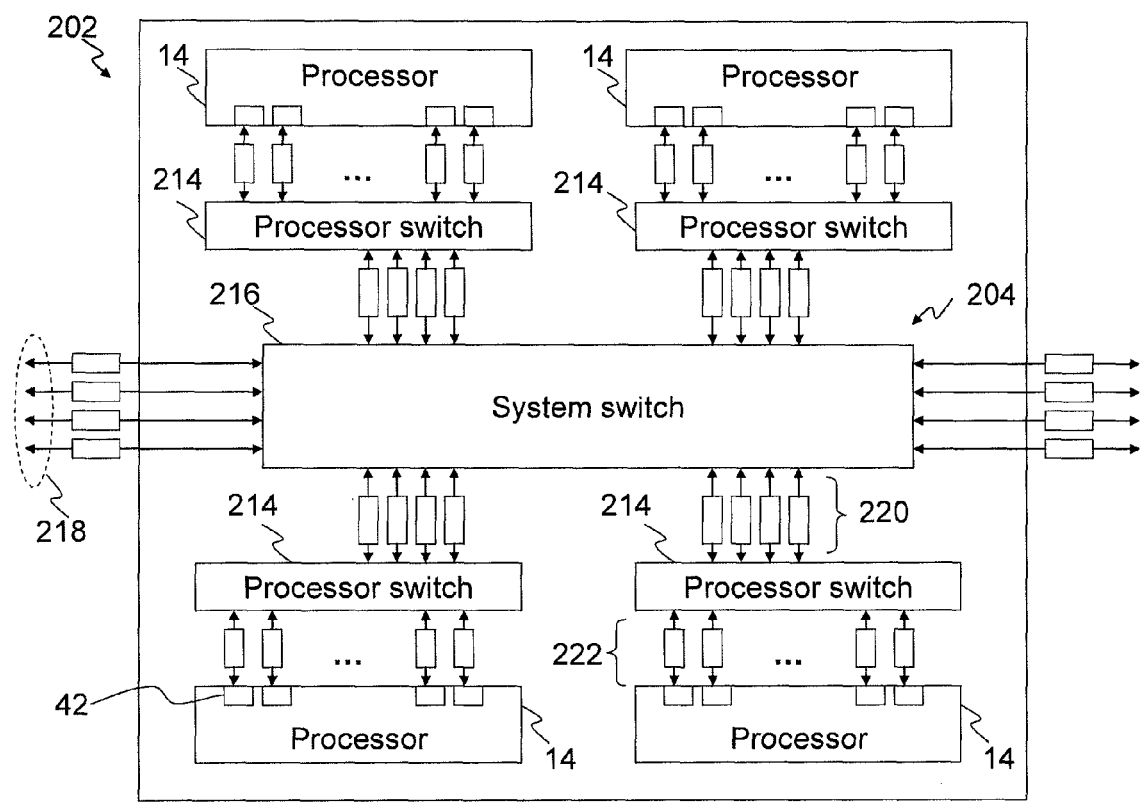
FIG. 8 is a schematic representation of an interconnect between processors.

Channels can also be established between threads on different processors. FIG. 8 illustrates a tile 202 comprising an interconnect node 204 for establishing channels between thread registers on different processors 14, each processor being of a type discussed above. The interconnect system is a direct hardware link between processors on the same circuit-board or chip, separate from the ports 22. It may be a serial interconnect and packet routing mechanism for use on boards and/or chips. However, as will be appreciated by a person skilled in the art, other types interconnect systems are possible. It is preferably arranged for very low power, low pin-out and ease of use.

Each interconnect node 204 comprises a system switch 216 and system links 218 which may be used to connect together other similar tiles 202 into an array, as illustrated in FIG. 2. One or more nodes 204 thus connected make up an interconnect system. The different processors' memories can each be sized to best match the target application and do not need to be the same size. The tiles may be on the same chip or on different chips. Each node 204 also comprises processor switches 214, one for each processor 14. Each processor switch connects between the system switch 216 via processor links 220 and the channel ends 42 of the processor 14 via channel links 222.

Note that it is beneficial for power consumption on the interconnect system to be minimised. In embodiments, the interconnect system of the present invention has a quiescent state with no power drain, and no need for sampling clocks, phase-locked loops or delay-locked loops at the receiver. Preferably, systems comprising such interconnects 204, such as the array 200, will use components which are powered up only when data starts to arrive on the links, 218, 220, 222.

Each link 218, 220, 222 uses four wires: a logic-one wire and a logic-zero wire in each direction. Bits are transmitted "dual-rail non-return-to-zero". That is, a logic-one bit is signalled by a transition on the logic-one wire and a logic-zero bit is signalled by a transition on the logic-zero wire (i.e. either a rising or a falling transition signals a bit).

Communications between processors 14 occur by means of tokens, which may be either control tokens for controlling the communications or data tokens which contain the actual data to be communicated. Channels carry messages constructed from data and control tokens between channel ends. Each token is preferably one byte. The data tokens comprise data, and the control tokens are used to encode communications protocols for controlling various aspects of the interconnect. Each of the switches 214, 216 contains hardware switching logic configured to act upon certain control tokens (see below) for establishing, controlling and closing channels.

A message is made up of a sequence of tokens, typically both data and control tokens. Optionally, a message may be divided into packets, with each packet comprising a certain number of the messages' tokens. The first token in a message or packet is a header token containing a destination address which identifies a destination node, a destination processor and a destination channel end. The last token in a message or packet is an "end of message" EOM or "end of packet" EOP token. An "end of data" EOD token may also be available to delineate within a packet. A software developer can use these EOM, EOP and EOD tokens to arrange the communications into messages and/or packets however they choose. The EOM, EOP and EOD are preferably indistinguishable from the interconnect switches' point of view, but may be used differently in software.

Each of the processors 14 comprises sets of thread registers 20 as discussed above. When connecting to a channel end on a different processor it is possible to use the channel in three ways. Firstly, a "streamed" channel can be established in an analogous manner to which channels are established within a single processor, i.e. by allocating a channel end in each respective processor to each of the two threads and connecting the channel ends by exchanging channel end IDs, and then using the channel to transfer a continuous stream of data or to transfer a number of messages. This effectively establishes a circuit between the two threads, and the information transmitted over the channel is just a stream of individual tokens. Secondly, a "packetised" channel can be used to perform packet routing, with each message or message packet starting by establishing the channel and ending by disconnecting it with an EOP or EOM control token. This allows the interconnect to be shared between many concurrent communications. The information transmitted has a well defined packet structure in which a set of outputs corresponds to a matching set of inputs. An unknown amount of buffering will be present in the channel. Thirdly, "synchronised" channels are similar to packetised channels, except they are zero buffered and in addition to performing the communication the threads are synchronised.

Once a channel is established, I/O and events can be performed over these channels just as with channels on the same processor.

In operation, a header token is received at the system switch 216 via either a system link 218 or a processor link 220. The system switch 216 reads the destination node address and, if it does not match the local node address, routes the packet to another node via a system link 218. If on the other hand the destination node address does match the local node address, the system switch 216 reads the destination processor address and routes the packet to one of the local processors 14 via a processor link 220. The processor switch 216 then reads the destination channel address and routes the message to the correct channel end 42 via the channel link 222 and interconnect 40.

Each link 218, 220, 222 contains control registers (not shown). Referring again to FIGS. 2 and 8, as the header token passes through each switch 214, 216 then the switch's switching logic is triggered by the header token to create a route from the source link to a dynamically allocated target link by writing the target link address to a control register of the source link and the source link address to a control register for the target link. Once a route exists, all further tokens are sent along that route. The route will be disconnected when an EOP, EOM or EOD token is sent along the route. The EOP/EOM/EOD disconnects each stage of the route as it passes through each switch 216, 220.

To elaborate, when data d is output to an unconnected channel end on a different processor, one of the links 222 is dynamically allocated for the channel, and used to forward the address d to an interconnect switch (remembering that this data d is the header, i.e. the address of the destination channel). The identifier of the link used is written to the channel output file in association with the $c^{th}$ entry. Subsequent outputs via c will access the $c^{th}$ entry to determine the link to be used to forward the output data. If the buffer in the link is full, the outputting thread will be paused; it will be released again when the link has forwarded the data and has room to buffer another output. This is done using the paused table.

When data starts to arrive at an unconnected link it is interpreted as the address of a destination channel end d, and this address is recorded in a register associated with the link. Subsequent data from the link will be written to the input buffer of the channel end d. If the buffer of the channel end d (i.e. the $d^{th}$ entry in the channel input file) is full, then the link flow control will prevent further data being sent by the switch until a thread has input sufficient data to make room in the input buffer.

When an input is executed on a channel end d, the input buffer is read to determine whether it contains data; if so the data is taken and the input completes. Otherwise the inputting thread is paused and will be released by the link supplying sufficient new data to the input buffer of d.

When a final EOM, EOP or EOD token is output via c, the EOM/EOP/EOD is forwarded to the switch and the $c^{th}$ entry in the output file is modified to record that the channel end is no longer connected. When the link receives the EOM/EOP/EOD, it is forwarded to d and the link is disconnected.

Note that advantageously, the same mechanism of channel ends is used both for communications between threads on the same processor and for threads on different processors. Importantly, this also means that the addresses of the channel ends (i.e. the channel end IDs) are system wide. That is to say, each channel end ID is unique within the whole system of interconnected processors, such as within an array 200. Resources are thus efficiently shared throughout the system, and programming is made easier.

Channel ends and links may be shared by several threads. It is useful to allow a single channel end to be used to receive messages from any number of threads. To do this, each input channel end has the claimed flag 43 to indicate whether or not it is currently in use. If it is found to be in use at the start of a message when the header is output, the outputting thread is paused; it will be released when an EOM, EOP or EOD next causes the channel end to become disconnected (and therefore available for a new connection). A similar mechanism is used for each link 218, 220, 222 to allow links to be shared between a number of outputting threads.

Also, note again that the channels are bidirectional. As each channel end has both input and output capabilities (status and data buffers), it can be used for both input and output at the same time. This means that any channel can be used to provide a pair of completely independent unidirectional channels, and in the case of channels between threads in different processors these will operate in opposite directions. Alternatively, a channel can be used to provide a bidirectional communication path to be used between two threads in which the direction of communication can change as the threads progress.

Further, note that once established, a single identifier (the local channel end ID) can be used to identify a bidirectional channel, rather than having to use both the local and remote channel end ID. In conjunction with the provision of a collection of channel ends 42, this makes channel communications very efficient. Use of a single identifier, is facilitated by the following features:

Storing the destination header in the local channel end, by means of the channel end identifier register CEID 41. An instruction may be provided for setting the CEID register 41 explicitly. This could be the SETD instruction described below.

Make the processor switches 214 automatically send the header first, from the CEID register 41, whenever an output is executed on an inactive (i.e. unconnected)

channel, rather than the header having to be output by a separate instruction. An inactive channel is one which has had no output executed since it was last disconnected. (note that if an EOM is the only token sent, e.g. as an acknowledgement, then the header is still automatically output first).

Making the EOM (or EOP or EOD) token return the channel to the inactive (i.e. disconnected) state.

This enables the channels to be set up at the right time, i.e. when they are declared in a program, and then only the local channel end address need be passed around in order to identify a channel. This is true even for a bidirectional channel, i.e. a thread can use a single identifier for both sending and receiving.

The details of the inter-processor communication tokens are discussed further below, but first some details of the instructions for controlling ports and channels are described for completeness. The interface processor can support several programming approaches due to its thread-based structure. It can be treated as a single conventional processor performing standard input and output, or it can be programmed as part of a parallel array of hundreds of communicating components. An instruction set is provided which supports these options. The instruction set includes special instructions which support initialisation, termination, starting and stopping threads and provide input/output communication. The input and output instructions allow very fast communications with external devices. They support high-speed, low-latency input and output and high-level concurrent programming techniques. Their application therein to handling port and channel activity is discussed more fully in the following, which describes example instructions that can be used to implement the present invention.

Resources are firstly reserved for a thread using a GETR instruction specifying the type of resource required, and can be freed again using a FREER instruction.

Ports can be used in input or output mode. In input mode a condition can be used to filter the data passed to the thread. A port can be used to generate events or interrupts when data becomes available as described below. This allows a thread to monitor several ports, only servicing those that are ready. Input and output instructions, IN and OUT, can then be used to transfer of data to and from ports once ready. In this case, the IN instruction inputs and zero-extends the n least significant bits from an n-bit port and the OUT instruction outputs the n least significant bits.

Two further instructions, INSHR and OUTSHR, optimise the transfer of data. The INSHR instruction shifts the contents of a register right by n bits, filling the left-most n bits with the data input from the n-bit port. The OUTSHR instruction outputs the n least significant bits of data to the n-bit port and shifts the contents of a register right by n bits.

```
OUTSHR port, s   port ◁ s[bits 0 for width(port)]; output from port
                 s ← s >> width(port)              and shift
INSHR            s ← s >> width(d);                              shift and
port, s          port ▷ s[bits (bitsperword − width(d)) for width(d)] input
                                                                 from port
where the "▷" represents an input and the "◁"represents an output.
```

A port must be configured before it can be used. It is configured using the SETC instruction which is used to define several independent settings of the port. Each of these has a default mode and need only be configured if a different mode is needed.

SETC port, mode  port[ctrl]←mode set port control

The effect of the SETC mode settings is described below. The first entry in each setting is the default mode.

| Mode | Effect |
|---|---|
| OFF | port not active; pin(s) high impedance |
| ON | active |
| IN | port is an input |
| OUT | port is an output (but inputs return the current pin value) |
| EVENT | port will cause events |
| INTERRUPT | port will raise interrupts |
| DRIVE | pins are driven both high and low |
| PULLDOWN | pins pull down for 0 bits, are high impedance otherwise |
| PULLUP | pins pull up for 1 bits, but are high impedance otherwise |
| UNCOND | port always ready; inputs complete immediately |
| EQUAL | port ready when its value is equal to its DATA value |
| NE | port ready when its value is different from its DATA value |
| TRANSITION | port ready when its value changes towards its DATA value |
| GR | port ready when its value is greater than its DATA value |
| LS | port ready when its value is less than its DATA value |

The DRIVE, PULLDOWN and PULLUP modes are only relevant when the port direction is OUT. The TRANSITION condition is only relevant for 1-bit ports and the GR and LS conditions are only relevant for ports with more than one bit.

Each port has a ready bit 37 which is used to control the flow of data through the port, and defines whether the port is able to complete input or output instructions. The ready bit is set in different ways depending on the port configuration. The ready bit is cleared when any of the SETC, SETD or SETV instructions are executed.

A port in input mode can be configured to perform conditional input. The condition filters the input data so that only data which meets the condition is returned to the program. When a condition is set, the IN and INSHR instructions will only complete when the port is ready. As described above, executing an input instruction on a port which is not ready will pause the thread. When ready, the port sets its ready bit which is signalled to the thread scheduler. The thread scheduler then resumes the thread, either by restarting the relevant instruction within the pipeline of the execution unit 16 or by re-executing the instruction, i.e. by re-issuing it into the pipeline. When the port is ready, the data is returned and the ready bit 37 is cleared.

Once a port ready bit is set, the data value which satisfied the condition is captured so that the software gets the value which met the condition even if the value on the port has subsequently changed. When an IN or INSHR instruction is executed and the ready bit is set then the data is returned and the ready bit cleared. If the ready bit is not set then the thread is paused until the ready bit is set. If a condition is set then the data is compared against the condition and the ready bit is only set when the condition is met.

When the OUT or OUTSHR instruction is executed if the ready bit is clear then the data is taken by the port and the ready bit is set. If the ready bit is set then the thread is paused until it is cleared by the port.

Communication between threads is performed using channels, which provide full-duplex data transfer between ends, whether the ends are both in the same processor, in different processors on the same chip, or in processors on different chips. Channels carry messages constructed from data and control tokens between two channel ends. The control tokens are used to encode communications protocols. Although most control tokens are available for software use, a number are reserved for encoding the protocol used by the interconnect hardware, and cannot be sent and received using instructions.

A channel end can be used to generate events and interrupts when data becomes available as described below. This allows the thread to monitor several channels and/or ports, only servicing those that are ready.

In order to communicate between two threads, two channel ends need to be allocated, one for each thread. This is done using the GETR CHAN instruction. The identifier of the channel end for the first thread must then be given to the second thread, and vice versa. The two threads can then use the resource identifiers to transfer messages using input and output instructions.

| OUTT | d ◁ s | output token |
| OUTCT | d ◁ s | output control token |
| INT | d ▷ s | input token |
| OUT | d ◁ s | output data word |
| IN | d ▷ s | input data word |
| TESTCT | d ← isctoken(s) | test for control token |
| TESTWCT | d ← hasctoken(s) | test word for control token |

Each message starts with a header containing the other thread's resource identifier. This is usually followed by a series of data or control tokens, ending with an end or message (EOM) control token. The OUT and IN instructions are used to transmit words of data through the channel; to transmit bytes of data the OUTT, INTT, OUTTSHL and INTTSHL instructions are used. OUTTSHL and INTTSHL are shifting instructions which are used to optimise communication starting with the most significant bytes of a word and are mainly used in the construction of the routing addresses in message headers.

| OUTTSHL channel, s | channel ◁ s[bits (bps – 8) for 8]; s ← s << 8 | output from channel and shift |
| INTSHL channel, s | s ← s << 8; channel ▷ s[bits 0 for 8] | shift and input from channel |

Channel ends have a buffer able to hold sufficient tokens to allow at least one word to be buffered. If an output instruction is executed when the channel is too full to take the data then the thread which executed the instruction is paused. It is restarted when there is enough room in the channel for the instruction to successfully complete. Likewise, when the instruction is executed and there is not enough data available, then the thread is paused and will be restarted when enough data becomes available.

In order to send control tokens over a channel the OUTCT instruction is used. A control token takes up a single byte of storage in the channel. On the receiving end the software can test whether the next byte is a control token using the TESTCT instruction, which waits until at least one token is available. It is possible to test whether the next word contains a control token using the TESTWCT instruction which waits until at least one control token has been received or until whole data word has been received.

After testing that a token is a control token it can be received with the INT. Once the token has been received, there may be no way to check whether it was a control token. If the channel end contains a mixture of data and control tokens an IN instruction will return them all as data.

When it is no longer required, the channel can be freed using FREE CHAN instructions. Otherwise it can be used for another message.

The interconnect in a system is shared by all channels. Within a processor there are no constraints on connectivity so channel ends do not have to disconnect from each other to allow interconnect sharing. They will only have to disconnect if the target channel end is being shared with another channel end.

However, when connecting to a channel end on a different processor, it is useful to ensure that the interconnect is shared efficiently with other channels in the system. This is done by breaking data being transmitted into packets and messages. Each packet or message starts with the header and ends with an end of packet (EOP) or EOM control token.

Events and interrupts allow resources (ports and channels) to automatically transfer control to a predefined event handler. The ability of a thread to accept events or interrupts is controlled by information held in the thread status register SR (see FIG. 4), and may be explicitly controlled using TSE and TSD instructions. This information comprises an event enable flag (EE) and an interrupt enable flag (IE).

| TSE s | SR ← SR ∨ s | thread state enable |
| TSD s | SR ← SR ∧ ¬s | thread state disable |

The operand of these instructions should be one of:

| EE | to enable or disable events |
| IE | to enable or disable interrupts |

Events are handled in the same scope in which they were set up. Hence, on an event all the thread's state is valid, allowing the thread to respond rapidly to the event. The thread can perform input and output operations using the port which gave rise to an event whilst leaving some or all of the event information unchanged. This allows the thread to complete handling an event and immediately wait for another similar event.

The program location of the event handler must be set prior to enabling the event using the SETV instruction. Ports have conditions which determine when they will generate an event; these are set using the SETC and SETD instructions. Channels are considered ready as soon as they contain enough data or have room to accept data for output.

Event generation by a specific port or channel can be enabled using an event enable unconditional (EEU) instruction and disabled using an event disable unconditional (EDU) instruction. The event enable true (EET) instruction enables the event if its condition operand is true and disables it otherwise; conversely the event enable false (EEF) instruction enables the event if its condition operand is false, and disabled it otherwise. These instructions are used to optimise the implementation of guarded inputs. Below are some example instruction formats for configuring events on ports, but it will be understood that the same instructions can apply in relation to channels.

| SETV port, v | port[vector] ← v | set event vector |
| SETD port, d | port[data] ← d | set event data |

| | | |
|---|---|---|
| SETC port, c | port[ctrl] ← c | set event control |
| EET port, b | port[enable]← b; port[ tid ] ← thread | event enable true |
| EEF port, b | port[enable]← ¬b; port[tid] ← thread | event enable false |
| EDU port | port[enable]← false; port[tid] ← thread | event disable |
| EEU port | port[enable]← true; port[tid] ← thread | event enable |

Having enabled events on one or more resources, a thread can use a WAITEU instruction to wait for at least one event. This may result in an event taking place immediately with control being transferred to the event handler specified by the corresponding event vector with events disabled by clearing the EE (event enable) flag. Alternatively the thread may be suspended until an event takes place—in this case the EE flag will be cleared when the event takes place, and the thread resumes execution.

| | | |
|---|---|---|
| WAITET b | if b then SR[EE] ← true | event wait if true |
| WAITEF b | if ¬ b then SR[EE] ← true | event wait if false |
| WAITEU | SR[EE] ← true | event wait |
| CLRE | SR[EE] ← false;<br>forall port<br>if port[tid] = thread then port[enable] ← false | disable all events for thread |

To optimise the common case of repeatedly waiting for one or more events until a condition occurs, conditional forms of the event wait instruction are provided. The WAITET instruction waits only if its condition operand is true, and the WAITEF waits only if its condition operand is false.

All of the events which have been enabled by a thread can be disabled using a single CLRE instruction. This disables event generation in all of the ports which have had events enabled by the thread. The CLRE instruction also clears the event-enabled status in the thread's status register.

In order to optimise the responsiveness of a thread to high priority resources, the TSE EE instruction can be used to enable events on a thread first before subsequently starting to enable the ports and/or channels and using one of the event wait instructions. This way, the processor can scan through the resources in priority order. This may cause an event to be handled immediately as soon as it is enabled.

In contrast to events, interrupts are not handled within the current scope and so the current PC and SR (and potentially also some or all of the other registers) must be saved prior to execution of the interrupt handler. On an interrupt generated by resource r the following occurs automatically:
SAVEPC←PC;
SAVESR←SR;
SR[EE]←false;
SR[IE]←false;
PC←r[vector]

When the handler has completed, execution of the interrupted thread can be performed by an RFINT instruction.

| | | |
|---|---|---|
| RFINT | PC ← SAVEPC;<br>SR ←SAVESR | return from interrupt |

An interrupt could interrupt a thread whilst suspended awaiting an event.

Returning now to the inter-processor communications, the details of the data and control tokens for use in such communications are now described. As mentioned, the links 218, 220, 222 each use four wires: a logic-one line and a logic-zero line in each direction, with bits being transmitted dual-rail non-return-to-zero, i.e. a logic-one is signalled by a transition on the one line and a logic-zero is signalled by a transition on the logic-zero line. Actual data is transmitted using data tokens which each carry eight bits in a ten-bit token, and control information is transmitted using control tokens each of which also carries eight bits in a ten-bit token. Both rails return to rest (zero) state at the end of every token (unless there is an error).

Data (and control) can be carried in both directions simultaneously. The tokens can be used to transport variable length packets or messages. Some control tokens are reserved for physical link control (such as flow control, initialisation and reset); and others are available to software for software link control (higher protocol layers).

Figure 9:
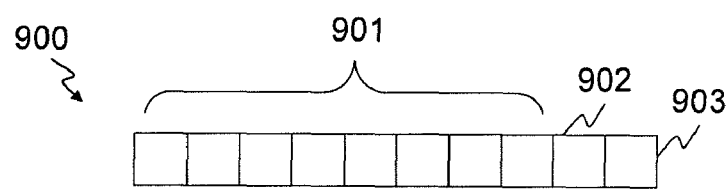
FIG. 9 shows a token format.

The coding of the control tokens is designed to ensure that the link returns to its quiescent state after every token. Tokens are encoded as follows, and as illustrated schematically in FIG. 9.

Every token 900 contains a first portion consisting of an information portion 901 and a first additional bit 902. The information portion is preferably a byte (eight bits) and is the actual data or control information carried by the token. The first additional bit indicates whether the token is a data or control token.

The first portion is therefore nine bits long, an odd number. Following the transmission of an odd number of bits, there would be two possibilities:

(a) an odd number of logic-zero bits and an even number of logic-one bits would have been transmitted, in which case there would be an odd number of transitions on the zero-line leaving it at a high voltage and an even number of transitions on the one-line leaving it at a low voltage; or (b) an even number of logic-zero bits and an odd number of logic-one bits would have been transmitted, in which case there would be an even number of transitions on the zero-line leaving it at a low voltage and an odd number of transitions on the one-line leaving it at a high voltage.

Therefore in order to ensure the link returns to a quiescent state, i.e. to ensure both the zero-line and the one-line return to a low voltage, a second portion is included in each token 900, in this case a second additional bit 903. In the case (a) above, the second additional bit is a logic-zero and in the case (b) above the second additional bit is a logic-one. In either case, the total number of both zeros and ones in the token is even, and the link is returned to its quiescent state (assuming both the zero-line and the one-line started off at a low voltage prior to transmission of the token).

In the case where the first portion has an odd number of bits (in this case a byte of information bits 901 and a first additional bit 902), then the second additional bit 903 can be calculated very efficiently by simply taking the bitwise-XOR of the first portion. For speedy calculation, this is preferably implemented by XOR logic circuitry in the interconnect 204 or processor 14, rather than in software.

With regard to the order of transmission, preferably the first additional bit 902 is transmitted first, followed by the information portion 901, then followed by the second additional bit 903.

But note that it does not actually matter where the first and second additional bits 902 and 903 are placed. The first and/or second additional bits could be placed at the beginning, end or even somewhere in the middle of the token—as long as the receiving side knows where to look for each bit.

The above has been described with the first portion (i.e. the information portion plus the first additional bit) having an odd number of bits. But note, if the first portion did have an even number of bits (e.g. if no first additional bit or an odd number of information bits were used), then a second portion could be calculated having two bits to ensure the link returned to the quiescent state.

Further, the above two-wire scheme using only two wires in each direction is a relatively basic embodiment allowing only serial communications in any given direction. Preferably, the links can in fact be switched between the slower, serial mode and a faster wide mode. The wide mode uses a different encoding scheme than the two-wire serial scheme, as described below.

In the wide mode, each link 218, 220, 222 uses "one-of-five" codes. According to one-of five coding, five wires provided in each direction for each link (so ten in total for each link including both directions). A code is transmitted on that link by signalling a transition on only one of those five wires at any one time, giving a total of five possible codes to map to different meanings (as opposed to two codes in the two-wire scheme, whereby the two "one-of-two" codes simply map directly to either a logic-one or logic-zero). For example, the codes could be mapped as follows:

| Code | Meaning |
| --- | --- |
| 00001 | value 00 |
| 00010 | value 01 |
| 00100 | value 10 |
| 01000 | value 11 |
| 10000 | escape |

(a "1" under the "code" heading above indicates either a rising or falling logical transition on a respective wire of the link, and a "0" indicates no logical transition).

A sequence of such codes, or "symbols", are then used to encode tokens. Over four cycles, it is possible to code $5^4$ tokens, i.e. 625, which is more than enough to encode both the data and control tokens. For example, if $v_i$ is a value in a symbol i and $e_i$ an escape code in a symbol i:

| Token | Use |
| --- | --- |
| $v_0 v_1 v_2 v_3$ | 256 data tokens |
| $e_0 v_1 v_2 v_3$ | 64 control tokens 192-255 |
| $v_0 e_1 v_2 v_3$ | 64 control tokens 128-191 |
| $v_0 v_1 e_2 v_3$ | 64 control tokens 64-127 |
| $v_0 v_1 v_2 e_3$ | 64 control tokens 0-63 |

Note, there may also be a few additional codes in which more than one symbol is an escape. These can be used to code certain control tokens such as EOM, e.g. as $e_0 e_1 v_2 s_3$, with $v_2$ signalling the EOM and $s_3$ being a code chosen to force all the signal lines to zero to return the link to the quiescent state. The additional symbol $s_3$ could be anything, and can involve more than one parallel transition on any of the five lines (unlike the codes v and e for values and escapes which are restricted to a single transition on only one of the five lines). That is, the transitions of $s_3$ are chosen as required to reset the lines to the quiescent state.

Using the above example, two consecutive escape codes $e_0 e_1$ will always result in an even number of transitions on the first wire and no transitions on any other wire. The value $v_2$ then results in an extra transition on one of the second to fifth wires. So for example, if all the wires started at a logic-low, then $e_0 e_1$ would leave all the wires at a logic low and the following $v_2$ would then leave one of the second to fifth wires at a logic high. The final code $s_3$ would therefore be chosen to be the same as $v_2$ to perform another transition on that same wire, thus returning it to the logic low-voltage. But if all the wires did not start at a logic low, then the wires could in general be left in any state and $s_3$ will be chosen as appropriate, including if necessary by comprising more than one parallel transition on any or all of the five lines.

Advantageously, it is possible to translate data between the two-wire and five-wire encodings on the fly.

The five-wire scheme is preferably used as an alternative mode to the two-wire scheme, but could instead be used alone or as an alternative to another link mode scheme.

For example, another scheme could be a three-wire scheme with three wires being provided for each link 218, 220, 222 in each direction and "one-of-three" codes being used to transmit data and control tokens. In this case, codes are transmitted by signalling a transition on only one of the three wires. In one example, pairs of codes could be transmitted consecutively to encode values or escapes as follows:

| Code1 | Code2 | Meaning |
| --- | --- | --- |
| 001 | 001 | value 000 |
| 010 | 001 | value 001 |
| 100 | 001 | value 010 |
| 001 | 010 | value 011 |
| 010 | 010 | value 100 |
| 100 | 010 | value 101 |
| 001 | 100 | value 110 |
| 010 | 100 | value 111 |
| 100 | 100 | escape |

(again, a "1" under the "code" heading above indicates either a rising or falling logical transition on a respective wire of the link, and a "0" indicates no logical transition).

In six handshake cycles, this scheme could code $3^6$ tokens, i.e. 729, which again is more than enough to encode the data and control tokens. Also, one of the escape codes could be used to provide several return-to-zero tokens such as EOM, e.g. as $v_0 v_1 e_2 v_3 v_4 v_5$, with $v_3$, $v_4$ and $v_5$ being chosen to force all the signal wires to zero.

Examples of data and control tokens are now described. It will be appreciated that these can be encoded using any suitable encoding scheme, including the two-wire, three-wire or five-wire schemes discussed above.

Conventionally, control of an interconnect between processors on a board or chip would be implemented solely in hardware and would not be visible or accessible to software. However, according to aspects of the present invention, the control tokens may be categorised as either "architecturally defined" (i.e. hardware defined) or "software defined". A control token is architecturally defined if one or more of the switches 214, 216 or links 218, 220, 222 in the interconnect 204 contains hardware logic to detect that token's value and, in response, to be triggered to control some aspect of the interconnect 204. That is, an architecturally defined control token's function is pre-determined by hardware logic in the interconnect 204. The hardware logic is triggered to perform this function without any need for the involvement of software running on the token's destination processor 14. Nonetheless, the present invention does also allow software access to certain of the architecturally defined control tokens, i.e.

certain architecturally defined control tokens may also be interpreted by software in order to provide additional functionality in software as defined by the software developer. A control token is software defined if there is no such hardware logic for detecting or acting upon that token's value, and instead the control token is interpreted only by software running on a receiving processor 14. Software defined control tokens are never interpreted by hardware in the interconnect 204, because there is by definition no logic for doing so.

In embodiments, the control tokens are actually divided into four groups: application tokens, special tokens, privileged tokens, and hardware tokens. Preferably, in the eight-bit portion 901 of the control token, the values 0-127 are used to encode application tokens, the values 128-191 are used to encode special tokens, the values 192-233 are used to encode privileged tokens, and the values 224-255 are used to encode hardware tokens, but other combinations may be implemented depending on application-specific requirements. The four different types of control token are as follows.

Application tokens are never interpreted by hardware, and are software defined. They are intended for use by compilers or applications software to facilitate the encoding of data structures and the implementation of application specific protocols.

Special tokens are architecturally defined and may be interpreted by hardware or software. They are used to give standard encodings of common data types and structures, and to encode protocols for transfer of data, programs and channels (for example).

Privileged tokens are architecturally defined and may be interpreted by hardware or privileged software. They are used to perform system functions including hardware resource sharing, control, monitoring and debugging. An attempt to transfer one of these tokens to or from un-privileged software will cause an exception.

Hardware tokens are only used by hardware. An attempt to transfer one of these tokens to or from software will cause an exception.

Also according to aspects of the present invention, messages including both control and data tokens are constructed in software. As mentioned above, conventionally control of the physical interconnect within a board or chip would remain the responsibility of dedicated hardware in the interconnect. That is, signals for controlling the physical interconnect would be generated by hardware in the interconnect and not by software running on the processors. Such control might for example include access to control registers of switches and links. However, according to the invention, both data and control tokens, and both architecturally and software defined control tokens, can be output onto the interconnect 204 from the operands of instructions (OUTCT instructions) executed by the execution units 16. These could either be immediate operands read directly from the instruction itself, or operands read from operand register OP specified by the relevant instruction. An alternative but not preferred option would be for a data or control token to be read from a memory address specified by an instruction. Only hardware tokens are never generated by software, and are used solely internally to the interconnect hardware circuitry.

Some examples of the different types of control token are now discussed. Application tokens have no pre-determined function and can be used for any purpose a software developer chooses. As mentioned above, it is envisaged that they will be used by compilers or applications for encoding data structures and implementing application specific protocols.

Examples of special tokens are:

| | |
|---|---|
| EOM | end of message |
| EOP | end of packet |
| EOD | end of data |
| READ | read from remote memory |
| WRITE | write to remote memory |
| ACK | acknowledge operation completed successfully |
| NACK | acknowledge that there was an error |

Where dynamic routing (i.e. packet switched routing) is used, a connection is established by a header token or tokens and disconnected by an EOM, EOP or EOD token. Note that header tokens are actually data tokens, but the switches 218, 220,222 contain logic configured to recognise data tokens as header tokens when output from channel end 40 that is not connected.

The EOM, EOP and EOD are architecturally defined because they each trigger hardware logic in the interconnect 204 to perform a specific function independently of any software running on the destination processor 14, namely triggering the switches 218, 220, 222 to disconnect a channel. The EOM, EOP and EOD are indistinguishable as far as the interconnect hardware is concerned. However, because they are also accessible to software, the software developer can use them to have different meanings in software. So for example, the software developer can choose to sub-divide a message into packets using the EOP token, and de-lineate within a packet using the EOD token.

A group of control tokens is used to provide the data communication and access protocol. These are normally interpreted by software, and include operations such as READ and WRITE which are used to access the memory of another tile. The READ and WRITE tokens are architecturally-defined if there is specific hardware logic at the processors 14, arranged to be triggered by the token, which is involved in the read or write function. Alternatively or additionally, read and write type operations could be implemented using application tokens.

The ACK and NACK tokens are transmitted in response to a previously received message or packet to indicate whether that message or packet was acted upon successfully. Alternatively or additionally, acknowledgement type operations could be implemented using application tokens.

In embodiments, privileged tokens are used for system initialisation, debugging, monitoring, etc. Examples are:

| | |
|---|---|
| WRITEID | write device identification number |
| READID | read device identification number |
| READTY | read device type |
| WRITEC | write configuration |
| READC | read configuration |
| START | start device |
| STOP | stop device |
| QSTATUS | query device status. |

The WRITEID, READID tokens are for writing and reading the identification number to and from the control registers of the switches 214, 216. The READTY token is for reading the type of a switch 214, 216 from its control register. The type indicates whether the switch is a system switch 216 or a processor switch 214. Each switch 214, 216 is uniquely identified within the array 200 by its identification number and type.

The WRITEC and READC tokens are for writing and reading configuration information to and from the control registers of the switches 214, 216. The configuration information may relate for example to routing tables used by the switches or to the tile address, and these tokens could be used for example in the initial setting up of an array 200.

The START and STOP tokens are for enabling and disabling switches 214, 216.

The QSTATUS token is for querying the control register of the links 218, 220, 222 to determine their status, for example to determine whether a link is in use (and if so in which direction).

Hardware tokens are used to control the operation of the communication links 220, 222. Examples are:

| | |
|---|---|
| CREDIT | allow transmission of data |
| LRESET | link reset |

A CREDIT control token is generated and sent from receiving link 220 or 222 to a sending link 220 or 222 to signify that the receiver is able to accept tokens, and to indicate the number of tokens' worth of space available in the receiving link.

Links 220, 222 can be restarted after errors, by a link generating and sending an LRESET token. The link replies by sending an LRESET token back. Both links reset only after they have both sent and received a LRSET token. Note that it does not matter if both links try to send an LRSET at the same time.

In one particularly advantageous embodiment using the five-wire scheme described above, the CREDIT token is encoded as an escape, a value, another escape, and that some value again, e.g. $e_0 v_1 e_2 v_3$ where $v_1$ is the same value as $v_3$. That way, the credit token is guaranteed not to change the state of any of the wires, because the two escape symbols always result in two opposite transitions on the same wire, and similarly the two value symbols always result in two opposite transitions on the same wire, leaving the link in the same state as it was before transmission of the CREDIT token. So if the link was carrying other values, they will not be affected by the CREDIT token. The CREDIT token can effectively "pass through" those values. This is useful because it allows hardware in the interconnect to pass CREDIT tokens around without having to worry about interfering with software tokens or other values on the link. The transmission of CREDIT tokens by the interconnect hardware can be completely autonomous.

A similar concept can be applied to CREDIT tokens in the three-wire scheme or other schemes, as long as it is possible to construct a token that has no overall effect on the state of the link.

Figure 10:
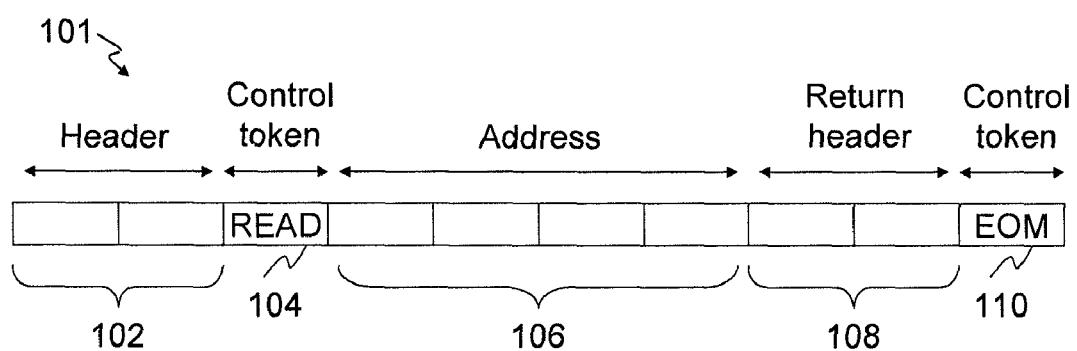
FIG. 10 shows a read request message format.

An example of software message construction is now described in relation to FIG. 10, which illustrates a read message 101 output by a one processor 14 (source processor) in order to read the memory 24 of another processor 14 (destination processor).

In operation, code running on the source processor 14 first generates a header 102 for output to the destination processor, specifying the address of the destination processor in order to create a channel in the manner described above. In this example, the header comprises two data tokens. Subsequently, after generating the header 102, the software generates a READ control token 104 in order to request a reading of the destination processor's memory. This READ control token is generated from the operand of an OUTCT instruction executed by the source processor. The control token informs the destination software what function it must carry out. Following generation of the READ token, the source software generates an address portion 106 and a return header 108, in this example four tokens long and two tokens long respectively, each token again being output by an OUTT instruction. These portions 106 and 108 provide the information required to carry out the request, i.e. the address of the word to load and the address of the processor to which the data must be returned. After generating the read address 106 and return header 108, the software generates an EOM control token 110 in order to close the channel.

Note that there are no constraints in the message format as to whether the address has to be word-aligned, or an offset into local memory, etc. That will depend on the software handling of the message.

Figure 11:
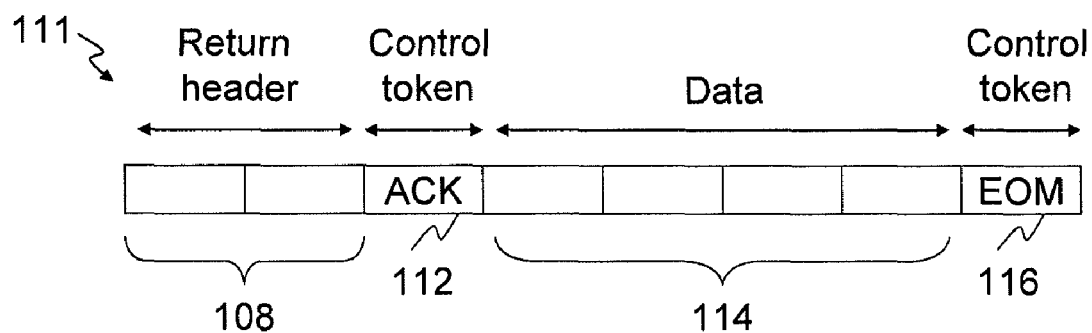
FIG. 11 shows a successful read response message format.

As illustrated in FIG. 11, a successful read response message 111 begins with the return header 108 as supplied by the read request message 101. The return header 108 is followed by a positive acknowledgement control token ACK 112 to indicate to the source processor that the read was successful. Subsequently, after generating the ACK control token 112, the destination software generates a return data portion 114 output from the address of the destination processor's memory as specified by the address portion 106. After generating the ACK 112, the software generates an EOM control token 116 to close the channel.

Figure 12:
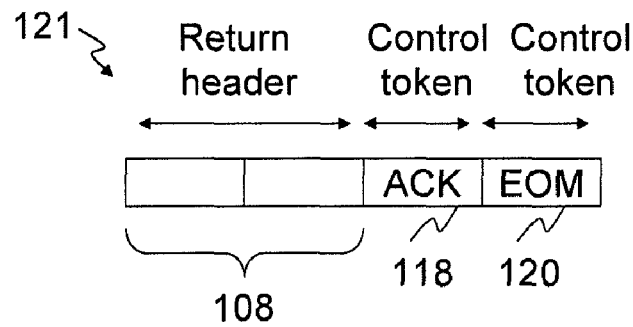
FIG. 12 shows a failed read response message format.

As illustrated in FIG. 12, an unsuccessful read response message 121 also begins with the return header 108 as supplied by the read request message 101. The return header 108 is followed by a negative acknowledgement control token NACK 118 to indicate to the source processor that the read was not successful, i.e. there was an error, for example because the address specified in the address portion 106 did not exist. In the case of such an error there is no need to return any data, so the NACK 118 is simply followed by a subsequent EOM control token to close the channel.

As described above, there are three ways of using channels: streamed, packetised and synchronised (synchronised channels being a type of packetised channel). Described below are some further refinements to the token and instruction sets to make these communications more efficient.

The first refinement is to provide a PAUSE control token which closes down a route in the switches 214, 216 but is not visible to the receiving processor 14 (or at least, it is ignored by input instructions executed on the receiving processor). The PAUSE token is a special case that has properties of both a hardware token and a special token: like a hardware token and unlike a special token, the PAUSE token is not accessible to software on the receiving processor; but unlike a hardware token and like a special token, it can be generated by software on the transmitting processor. This means that a stream can be paused and the interconnect routes released temporarily without any special code in the receiver. To continue, the sender just starts to send tokens again. PAUSE has no effect if the destination channel end is on the same processor. PAUSE could be used as an alternative to the EOP token.

The second refinement is to provide a quick way to send and check EOM tokens. This is achieved using one address OUTEOM and CHKEOM instructions. OUTEOM outputs an EOM token. CHKEOM traps unless the next token received is an EOM token. INT and IN instructions trap if they are used on an EOM token. Traps have a similar effect to interrupts, except that they are generated automatically by a specific error conditions and transfer to specific trap vectors. The principles of a trap will be familiar to a person skilled in the art.

The third refinement is to provide an OUTPAUSE instruction so the PAUSE token doesn't need to be separately coded.

Examples of code sequences for setting up and controlling channels are given below. Setting up a channel between two threads on the same processor is as follows:

```
GETR CHAN c1
GETR CHAN c2
SETD c1, c2
SETD c2, c1
```

Channel end identifier c1 or c2 can then be passed to another thread when it's being initialised.

A remote channel, i.e. between threads on two different processors, may be established when booting the remote processor by executing:

```
GETR CHAN, c1
```
and then sending a bootstrap program containing:
```
...
GETR CHAN, c2
SETD c2, c1
OUT c2, c1    // output identifier of channel end
...
```
and finally executing:
```
IN c1, c2              // input identifier of channel end
SETD c1, c2
```

In both examples above, communications can then be performed using only the identifier of one end of the channel.

Example code for setting up and controlling the three different types of channel, streamed, packetised and synchronised, is now described.

A streamed channel c can be operated simply using outputs and inputs. A "pause(c)" (pause channel) instruction may also be available to generate the PAUSE token, which can be done at any time to break up the transfer, and this will be invisible to the inputting thread. At a high-level, the code for receiving tokens over a streamed channel might look like:

```
switch c=>> s
    case ct1...    // if control token 1...
    case ct2...    // if control token 2...
    ...
    default control...
    case dt1       // if data token 1...
    case dt2       // if data token 2...
    default data...
``` which would be compiled into:

```
TESTCT   c,      flag
IN       c,      s
BFF      flag, data   // branch to "data" if data token
[code for control token s...]
BFU end                // branch to "end"
data:
[code for data token s...]
end:
```

For unidirectional communication on a packetised channel c, the high-level code on the transmitting processor P:
out (c) { . . . } // sequence of instructions including outputs on c would be compiled to:

```
OUTT c, token1
OUTT c, token2
...
OUTEOM c
```

(note that in preferred embodiments, as discussed above, there is no need for an OUTT to output the header, because the header is automatically transmitted from the CEID register 41 when outputting to an unconnected channel end 42)

and the high-level code on the receiving processor Q:

```
in (c) {...}    // sequence of instructions including inputs on c
would be compiled to:
INT c, token1
INT c, token2
...
CHKEOM c
```

Note that if P sends too may tokens, Q's CHKEOM will trap, and if P sends too few tokens one of Q's inputs will trap. So the CHKEOM instruction enforces the packet structure of the communications between processors.

For communication on a synchronised channel c (a type of packetised channel), the code on the transmitting processor P:

```
out (c) {...}    // sequence of instructions including outputs on c
would be compiled to:
OUTT c, token1
OUTT c, token2
...
OUTEOM c
CHKEOM c
``` and the high-level code on the receiving processor Q:

```
in (c) {...}     // sequence of instructions including inputs on c
would be compiled to:
INT c, token1
INT c, token2
...
CHKEOM c
OUTEOM c
```

Again, note that if P sends too many tokens, Q's CHKEOM will trap and if P sends too few tokens then one of Q's inputs will trap. Also, Q cannot proceed until P has sent it's EOM, and P cannot proceed until Q has sent it's EOM, so P and Q are synchronised. That is, Q's CHKEOM ensures that Q cannot respond until it has received the entire packet from P, and P's CHKEOM ensures that P cannot continue with any further communications until it has received an entire acknowledgement packet from Q including a return EOM.

In both packetised and synchronised communication, if P and Q communicate in both directions then the above instructions can be used to ensure the correct number of tokens are sent in each direction.

It will be appreciated that the above embodiments are described only by way of example. In other embodiments, different sets of registers and instructions may be provided depending on the desired specifications of the chip. Event buffers 38' could be provided for the output buffers 46 of the channel ends 42, as an alternative or in addition to for the input buffer 44. Threads may be scheduled based on activity from other sources other than ports and channels. Channel ends have been described as having input and output buffers, but one-way channel ends could also be used. Different connections may be provided between the various components of the processor, and/or different arrangements of interconnects 204 may be provided between processors and/or tiles 202. Data and/or control tokens may be generated and/or arranged in different orders. Headers, messages, addresses and/or tokens may be of different lengths and operate on different quantities of data. Also, the invention is not specific to use in a mobile terminal with a mobile applications processor. Other applications and configurations will be apparent to the person skilled in the art. The scope of the invention is not limited by the described embodiments, but only by the following claims.

The invention claimed is:

1. A method comprising:
   transmitting a plurality of messages over an interconnect between processors, each of the processors comprising a respective pipeline, and each of said messages comprising a header token specifying a destination one of said processors and in addition at least one of a data token and a control token;
   executing a first instruction on a first one of said processors to generate a data token comprising a byte of data and at least one additional bit to identify that token as a data token;
   outputting the data token from said first processor onto said interconnect as part of one of said messages;
   executing a second instruction on said first processor to generate a control token comprising a byte of control information and at least one additional bit to identify that token as a control token; and
   outputting the control token from said first processor onto said interconnect as part of one of said messages.

2. A method according to claim 1, wherein the interconnect comprises a system of switches and links connecting between said processors, said processors being on the same board or chip.

3. A method according to claim 1, wherein at least a portion of one of said data token and said control token is the operand of the respective one of said first instruction and said second instruction.

4. A method according to claim 3, wherein said operand is read from an operand register specified by the respective one of the first instruction and the second instruction.

5. A method according to claim 3, wherein said operand is an immediate operand read directly from the respective one of the first instruction and the second instruction.

6. A method according to claim 1, wherein at least a portion of one of said data token and said control token is retrieved from an addressable location specified by the respective one of the first instruction and said second instruction.

7. A method according to claim 1, wherein said control token is an architecturally-defined control token configured to trigger logic in said interconnect to control a component of said interconnect.

8. A method according to claim 7, wherein said architecturally-defined control token is accessible by software executed on the respective destination processor.

9. A method according to claim 8, wherein said architecturally-defined control token is a privileged control token accessible only by privileged software executed on the destination processor.

10. A method according to claim 1, wherein said control token is a software-defined control token configured to control a function in software executed on the respective destination processor.

11. A method according to claim 2, wherein at least one of said links comprises a one-line and a zero-line, wherein a logical transition on the one-line indicates a logic-one and a logical transition on the zero-line indicates a logic zero, each of said data and control tokens being transmitted on said link; and the transmission of each of said data and control tokens comprises:
    transmitting a first portion of the token comprising said byte of data in case of a data token and said byte of control information in case of a control token, and further comprising a first additional bit to identify whether the token is a data token or a control token; and
    transmitting a second portion of the token to ensure the total number of logic-one bits in the token is even and the total number of logic-zero bits in the token is even, such that the link returns to a quiescent state at the end of the token.

12. A method according to claim 11, comprising:
    determining whether the first portion contains an even number of bits at logic-one and an odd number of bits at logic-zero, or whether the first portion contains an odd number of bits at logic-one and an even number of bits at logic-zero;
    wherein on the condition that the first portion contains an even number of logic-ones and odd number of logic-zeros, the second portion is a logic-zero bit; and
    on the condition that the first portion contains an odd number of logic-ones and even number of logic-zeros, the second portion is a logic-one bit.

13. A method according to claim 1, comprising establishing a streamed channel between the first processor and the destination processor.

14. A method according to claim 13, comprising:
    outputting a pause token from the first processor to temporarily close the streamed channel, the pause token being ignored by input instructions executed on the destination processor; and
    reopening the streamed channel upon transferal of further information over that channel.

15. A method according to claim 1, comprising establishing a packetised channel between the first processor and the destination processor, and transferring said messages over the packetised channel in the form of packets each including a header and an end-of-message token configured to close the packetised channel in said interconnect.

16. A method according to claim 15, comprising:
    receiving a first one of said packets at the destination processor from the first processor;
    executing, on the destination processor, an input instruction which traps if it detects receipt of an end-of-message token in said first packet; and
    subsequently executing, on the destination processor, a check-end-of-message instruction which traps unless it detects receipt of an end-of-message token in one of said packet from the first processor.

17. A method according to claim 16, wherein the packetised channel is a synchronised channel, whereby the method comprises:
    transmitting a return packet comprising a further end-of message token to the first processor from the destination processor;

executing, on the first processor, a further check-end-of-message instruction which traps unless it detects receipt of the further end-of-message token from the second processor.

18. A method according to claim 1, wherein said control token is one of: an end-of-message token, a read token to read from the destination processor's memory, a write token to write to write to the destination processor's memory, an acknowledgement token to acknowledge successful completion of an operation, an error token to indicate an unsuccessful attempt at an operation, a read ID token to read an identifier from a control register of one of said switches, a write ID token to write an identifier to a control register of one of said switches, a read type token to read a device type from one of said switches, a read configuration token to read configuration information from a control register of one of said switches, a write configuration token to write configuration information to a control register of one of said switches, a start token to enable one of said switches, a stop token to disable one of said switches, and a query token to query the status of one of said links.

19. A method according to claim 1, wherein the interconnect is between of more than two processors of an array.

20. A method according to claim 1, comprising discarding a header token of a message before reaching the destination processor.

21. A method comprising:
receiving messages over an interconnect between processors, each of the processors comprising a respective pipeline;
receiving at a destination one of said processors, via said interconnect, a token comprising a byte and at least one additional bit;
executing software on said destination processor to determine from said additional bit whether the token is a control token or a data token; and
on the condition that the token is a control token, receiving said control token using software executed on the destination processor in order to perform a function in software.

22. A method according to claim 21, wherein said control token is an architecturally-defined control token, and the method comprises using the control token to trigger logic in said interconnect to control a component of said interconnect.

23. A method according to claim 22, wherein said architecturally-defined control token is a privileged control token accessible only to privileged software executed on the destination processor.

24. A method according to claim 21, wherein said control token is a software-defined control token.

25. A device comprising:
a first processor arranged to transmit messages over an interconnect between a plurality of processors including said first processor, each of the processors comprising a respective pipeline, and each of said messages comprising a header token specifying a destination one of said processors and at least one of a data token and a control token;
wherein the first processor is configured to:
execute a first instruction to generate a data token comprising a byte of data and at least one additional bit to identify that token as a data token;
output the data token from said first processor onto said interconnect as part of one of said messages;
execute a second instruction to generate a control token comprising a byte of control information and at least one additional bit to identify that token as a control token; and
output the control token from said first processor onto said interconnect as part of one of said messages.

26. A device according to claim 25, wherein the device further comprises said interconnect and said destination processor, the interconnect comprising a system of switches and links connecting said processors, and said device being comprised within the same board or chip.

27. A device according to claim 25, wherein at least a portion of one of said data token and said control token is the operand of the respective one of said first instruction and said second instruction.

28. A device according to claim 27, wherein the processor is configured to read said operand from an operand register specified by the respective one of the first instruction and the second instruction.

29. A device according to claim 27, wherein said operand is an immediate operand, the first processor being configured to read the immediate operand directly from the respective one of the first instruction and the second instruction.

30. A device according claim 25, wherein the processor is configured to retrieve at least a portion of one of said data token and said control token from an addressable specified by the respective one of the first instruction and said second instruction.

31. A device according to claim 25, wherein said control token is an architecturally-defined control token configured to trigger logic in said interconnect to control a component of said interconnect.

32. A device according to claim 31, wherein said architecturally-defined control token is accessible by software executed on the respective destination processor.

33. A device according to claim 32, wherein said architecturally-defined control token is a privileged control token accessible only by privileged software executed on the destination processor.

34. A device according to claim 25, wherein said control token is a software-defined control token configured to control a function in software executed on the respective destination processor.

35. A device according to claim 26, wherein at least one of said links comprises a one-line and a zero-line, wherein a logical transition on the one-line indicates a logic-one and a logical transition on the zero-line indicates a logic zero, each of said data and control tokens being transmitted on said link; and the first processor is configured to transmit each of said data and control tokens by:
transmitting a first portion of the token comprising said byte of data in case of a data token and said byte of control information in case of a control token, and further comprising a first additional bit to identify whether the token is a data token or a control token; and
transmitting a second portion of the token to ensure the total number of logic-one bits in the token is even and the total number of logic-zero bits in the token is even, such that the link returns to a quiescent state at the end of the token.

36. A device according to claim 35, wherein the first processor is configured to determine whether the first portion contains an even number of bits at logic-one and an odd number of bits at logic-zero, or whether the first portion contains an odd number of bits at logic-one and an even number of bits at logic-zero;

wherein on the condition that the first portion contains an even number of logic-ones and odd number of logic-zeros, the second portion is a logic-zero bit; and on the condition that the first portion contains an odd number of logic-ones and even number of logic zeros, the second portion is a logic-one bit.

37. A device according to claim 25, wherein the first processor is arranged to execute software to established a streamed channel with the destination processor to transfer information over that channel in a streamed manner.

38. A device according to claim 37, wherein the first processor is arranged to output a pause token configured to temporarily close the streamed channel but to be ignored by input instructions executed on the destination processor, the streamed channel being reopened upon transferal of further information over that channel.

39. A device according to claim 25, wherein the first processor is arranged to execute software to establish a packetised channel with the destination processor to transfer information over a channel in a packetised manner, by transferring said messages in the form of packets each including a header and an end-of-message token.

40. A device according to claim 39, wherein the destination processor is arranged to receive a first one of said packets from the first processor, to execute an input instruction which traps if it detects an end-of-message token in said first packet, and to execute a check-end-of-message instruction which traps unless it detects of an end-of-message token in said first packet.

41. A device according to claim 40, wherein the packetised channel is a synchronised channel, whereby the destination processor is arranged to transmit a return packet comprising a further end-of message token to the first processor, and the first processor is arranged execute a further check-end-of-message instruction which traps unless it detects a further end-of-message token in said return packet.

42. A device according to claim 25, wherein said control token is one of: an end-of-message token, a read token to read from the destination processor's memory, a write token to write to write to the destination processor's memory, an acknowledgement token to acknowledge successful completion of an operation, an error token to indicate an unsuccessful attempt at an operation, a read ID token to read an identifier from a control register of one of said switches, a write ID token to write an identifier to a control register of one of said switches, a read type token to read a device type from one of said switches, a read configuration token to read configuration information from a control register of one of said switches, a write configuration token to write configuration information to a control register of one of said switches, a start token to enable one of said switches, a stop token to disable one of said switches, and a query token to query the status of one of said links.

43. A device according to claim 25, wherein the interconnect is between more than two processors of an array.

44. A device according to claim 25, wherein the interconnect is configured to discard a header token of a message before that message reaches the destination processor.

45. A device for receiving messages from a first processor, the device comprising a destination processor and a interconnect between processors, the destination processor being configured to:
receive, via said interconnect, a token comprising a byte and at least one additional bit;
execute software to determine from said additional bit whether the token is a control token or a data token; and
on the condition that the token is a control token, receiving said control token using software executed on the destination processor in order to perform a function in software.

46. A device according to claim 45, wherein said control token is an architecturally-defined control token, and the interconnect is configured to be triggered by the control token to control a component of said interconnect.

47. A device according to claim 46, wherein said architecturally-defined control token is a privileged control token accessible only to privileged software executed on the destination processor.

48. A device according to claim 45, wherein said control token is a software-defined control token.

49. A computer program product comprising code which when executed by a first processor performs the steps of:
transmitting messages over an interconnect between a plurality of processors including said first processor, each of the processors comprising a respective pipeline, and each of said messages comprising a header token specifying a destination one of said processors and at least one of a data token and a control token;
generating a data token comprising a byte of data and at least one additional bit to identify that token as a data token;
outputting the data token from said first processor onto said interconnect as part of one of said messages;
generating a control token comprising a byte of control information and at least one additional bit to identify that token as a control token; and
outputting the control token from said first processor onto said interconnect as part of one of said messages.

50. A computer program product comprising code which when executed by a first processor performs the steps of:
receiving messages over an interconnect between a plurality of processors including said first processor, each of the processors comprising a respective pipeline;
receiving at a destination one of said processors, via said interconnect, a token comprising a byte and at least one additional bit;
executing software on said destination processor to determine from said additional bit whether the token is a control token or a data token; and
on the condition that the token is a control token, accessing said control token using software executed on the destination processor in order to perform a function in software.

51. A device comprising:
a first processing means for transmitting messages over interconnection means between a plurality of processing means including the first processing means, each of the processing means comprising a respective pipeline, and each of said messages comprising a header token specifying a destination processing means and at least one of a data token and a control token
wherein the first processing means comprises:
execution means for executing a first instruction to generate a data token comprising a byte of data and at least one additional bit to identify that token as a data token;
outputting means for outputting the data token from said first processing means onto said interconnection means as part of one of said messages;
wherein the execution means is further for executing a second instruction to generate a control token comprising a byte of control information and at least one additional bit to identify that token as a control token; and the outputting means is further for outputting the control token from said first processing means onto said interconnection means as part of one of said messages.

52. A device comprising:
a destination processing means; and
an interconnection means for connecting between a plurality of processing means including a destination processing means, wherein each of the processing means comprises a respective pipeline;
wherein the destination processing means comprises:
receiving means receiving messages from a first of said processing means via said interconnection means, including for receiving, via said interconnection means, a token comprising a byte and at least one additional bit; and
execution means for executing software to determine from said additional bit whether the token is a control token or a data token;
wherein in the execution means is further for, on the condition that the token is a control token, accessing said control token using software executed on the destination processing means in order to perform a function in software.

53. A method according to claim 2, wherein at least one of said links comprises at least three lines arranged to transmit said data and control tokens using an encoding scheme whereby predetermined configurations of logical transitions on said lines are used to signal respective codes; and
wherein the transmission of each of the data and control tokens comprises transmitting a sequence of codes selected from said codes, said additional bit for each of the data and control tokens being encoded in at least one of the transmitted codes.

54. A method according to claim 53, wherein the link comprises five lines, logical transitions on four of said lines encoding respective values and a logical transition on the remaining fifth of said lines signalling an escape code;
wherein the transmission of the data token comprises transmitting a sequence of codes signalled on said four lines, said additional bit for the data token being encoded by none of the codes in the data token being an escape code signalled using said fifth line; and
wherein the transmission of the control token comprises transmitting a sequence of codes selected from said codes including the escape code, said additional bit for the data token being encoded by the signalling of the escape code using said fifth line.

55. A method according to claim 53 or 54, comprising transmitting at least one of said codes to ensure the total number of logical transitions on each of said lines following one or more tokens returns the link to a quiescent state.

56. A method according to claim 53, comprising transmitting a credit token generated by the link to indicate a free capacity of the link, the credit token comprising one or more pairs of said codes, the codes in each pair being the same, so that the total number of transitions on each of said lines is either even nor zero thus leaving the state of the link unaffected after transmission of the credit token.

57. A device according to claim 26, wherein at least one of said links comprises at least three lines arranged to transmit said data and control tokens using an encoding scheme whereby predetermined configurations of logical transitions on said lines are used to signal to respective codes; and
wherein the first processor is configured to transmit each of the data and control tokens by transmitting a sequence of codes selected from said codes, said additional bit for each of the data and control tokens being encoded in at least one of the transmitted codes.

58. A device according to claim 57, wherein the link comprises five lines, logical transitions on four of said lines encoding respective values and a logical transition on the remaining fifth of said lines signalling an escape code;
wherein the first processor is configured to transmit the data token by transmitting a sequence of codes signalled on said four lines, said additional bit for the data token being encoded by none of the codes in the data token being an escape code signalled on said fifth line; and
wherein the first processor is configured to transmit the data token by transmitting a sequence of codes selected from said codes including the escape code, said additional bit for the data token being encoded by the signalling of the escape code on said fifth line.

59. A device according to claim 57 or 58, wherein the first processor is configured to transmit at least one of said codes to ensure the total number of logical transitions on each of said lines following one or more tokens returns the link to a quiescent state.

60. A device according to claim 57, wherein the link is configured to generate a credit token to indicate a free capacity of the link, the credit token comprising only one or more pairs of said codes, the two codes in each pair being the same, so that the total number of transitions on each of said lines is either even nor zero thus leaving the state of the link unaffected after transmission of the credit token.

61. The method of claim 1, wherein the message comprises at least two header tokens each comprising a respective byte of address data.

62. The device of claim 25, wherein the message comprises at least two header tokens each comprising a respective byte of address data.

* * * * *